US009177199B2

(12) United States Patent
Sanger

(10) Patent No.: US 9,177,199 B2
(45) Date of Patent: Nov. 3, 2015

(54) SEMANTIC MAGAZINE PAGES

(75) Inventor: Kurt M. Sanger, Rochester, NY (US)

(73) Assignee: EASTMAN KODAK COMPANY, Rochester, NY (US)

( * ) Notice: Subject to any disclaimer, the term of this patent is extended or adjusted under 35 U.S.C. 154(b) by 486 days.

(21) Appl. No.: 13/197,348

(22) Filed: Aug. 3, 2011

(65) Prior Publication Data
US 2013/0035081 A1 Feb. 7, 2013

(51) Int. Cl.
G06K 9/46 (2006.01)
G06K 9/00 (2006.01)
G06K 9/22 (2006.01)

(52) U.S. Cl.
CPC ............ *G06K 9/00463* (2013.01); *G06K 9/228* (2013.01)

(58) Field of Classification Search
CPC .............................. G06K 9/46; G06K 9/00442
USPC .......................................... 715/251, 274, 746
See application file for complete search history.

(56) References Cited

U.S. PATENT DOCUMENTS

| | | | |
|---|---|---|---|
| 6,449,377 B1 | 9/2002 | Rhoads | |
| 6,839,066 B2 * | 1/2005 | Muramoto | 345/589 |
| 7,174,031 B2 | 2/2007 | Rhoads et al. | |
| 7,437,351 B2 | 10/2008 | Page | |
| 7,565,139 B2 | 7/2009 | Neven, Sr. et al. | |
| 7,676,117 B1 | 3/2010 | Rowley et al. | |
| 7,751,805 B2 | 7/2010 | Neven et al. | |
| 2003/0237054 A1 * | 12/2003 | Donahue | 715/525 |
| 2004/0051732 A1 * | 3/2004 | White et al. | 345/736 |
| 2004/0130636 A1 * | 7/2004 | Schinner et al. | 348/239 |
| 2006/0044599 A1 * | 3/2006 | Lipowitz et al. | 358/1.15 |
| 2007/0046983 A1 * | 3/2007 | Hull et al. | 358/1.15 |
| 2007/0156761 A1 * | 7/2007 | Smith, III | 707/104.1 |
| 2008/0107337 A1 | 5/2008 | Furmaniak et al. | |
| 2008/0107338 A1 | 5/2008 | Furmaniak et al. | |
| 2009/0310152 A1 * | 12/2009 | Roulland et al. | 358/1.9 |
| 2010/0166309 A1 * | 7/2010 | Hull et al. | 382/176 |
| 2010/0306645 A1 * | 12/2010 | Roulland et al. | 715/271 |
| 2011/0157215 A1 * | 6/2011 | Aoyagi | 345/593 |

OTHER PUBLICATIONS

P. Kovesi; Image Features from Phase Congruency, Videre: Journal of Computer Vision Research, Quarterly Journal, Summer 1999, vol. 1, No. 3, The MIT Press.
T. Rikert, M. Jones, and P. Viola; A Cluster-Based Statistical Model for Object Detection, 1999.
C. Jacobs, A. Finkelstein, and D. Salesin; Fast Multiresolution Image Querying, Computer Graphics Proceedings (Proceedings of SIGGRAPH 95), 1995.

\* cited by examiner

*Primary Examiner* — Stephen Hong
*Assistant Examiner* — Marshon Robinson
(74) *Attorney, Agent, or Firm* — Nelson Adrian Blish

(57) ABSTRACT

A method for providing user interaction with a printed page (10) includes providing artwork (20) for a first page to be printed; providing a printing model to simulate a first printed page using the artwork; simulating the first page to be printed using the printing model; extracting a first set of features from the first simulated page (220); and embedding the first set of extracted features in a first URL (270). The invention includes printing the first page; capturing a digital image of the printed page (415) with a mobile device (400); extracting features (430) from the digital image; generating the URL associated with the digital image using the features extracted from the digital image; and navigating to the generated URL using a web browser (470).

15 Claims, 15 Drawing Sheets

SEMANTIC MAGAZINE PAGES

FIELD OF THE INVENTION

The invention relates in general to a method of creating unique uniform resource locator (URL) links from artwork to be printed and in particular to using a mobile camera application to generate one of the unique URLs, and displaying the URL page.

BACKGROUND OF THE INVENTION

Google Inc. has an application called Google Goggles that sends a customer image to their server, which scans the image and returns a Google search page based on the scanned image.

U.S. Pat. No. 7,751,805 (Neven et al.) discloses a mobile telephone, a remote recognition server, a remote media server, a camera in the mobile phone, communication link for transmitting an image from the camera to the remote recognition server and for receiving mobile media content from the remote media server, matching an image from the phone with an object representation in a database using the remote recognition server, and forwarding an associated text identifier to the remote server based on the associated text identifier. Neven et al. discloses a VMS server including a visual recognition server and a media server. The visual recognition server recognizes objects within an image and enables storing of new objects in a database. The media server maintains content associated with a given ID and delivers the content to the client. Neven et al. discloses downloading applications to mobile devices using a VMS client. Application developers submit images to the VMS service.

Neven et al. states, "To implement an effective vision-based search engine it will be important to combine multiple algorithms in one recognition engine or alternatively install multiple specialized recognition engines that analyze the query images with respect to different objects." All results are returned, or a hierarchy among the recognition disciplines are returned, or one result is returned. Objects should be updated regularly. The recognition output may be an image description. Recognition may be of objects, faces, and characters. Time, location, user profile, recent phone transactions, and additional user inputs may be used to correctly identify the image. Neven et al. discloses sending a low resolution image first, then additional image detail if required.

Neven et al. mentions SIFT feature approach of Davide Lowe (1999), extraction of feature vectors from key interest points with comparison of corresponding feature vectors and similarity measurement and comparison to thresholds as the basic elements of any successful recognition system. In addition, an interest operator is mentioned using phase congruency of Gabor Wavelengths as being superior to affine harris or DOG Laplace (Kovesi 1999). For Feature Vectors Gabor Wavelengths are used instead of Lowe's SIFT features, augmented with learned features (Viola and Jones 1999). Additionally dictionaries of feature vectors extracted from images from different viewing and lighting conditions are used. To cut down on search times color histograms and texture descriptors such as proposed under MPEG7 are used.

Neven et al. discloses performing optical character recognition on the image, identifying pictures of products and associating the product with the user, identifying portions of a printed page and returning real-time information about the text, converting a picture into a phone number or email address or SMS text message or web address. Neven et al. discloses media bridging and mobile advertising specifically searching on published pages, "together with publishing of the newspaper, magazine or book it will be necessary to submit digital pictures of the pages to the recognition servers so that each part of the printed material can be annotated." From a picture of a billboard the user may enter a contest, or the advertiser may count clicks, and the advertisement may be adjusted based upon the clicks from users. Real-time data taken from billboards may be used to confirm that the billboard is targeting customers. The billboard may be electronic such that the advertisement may be changing in real-time. There are additional disclosures for use of these images in the patent. User feedback or user inactivity of the search results, are used to score how well the image was found.

U.S. Pat. No. 7,676,117 (Rowley et al.) discloses a system of identifying similar images using histograms, image intensities, edge detectors or wavelets. Concatenated labels are assigned to the similar images. Rowley et al. discloses using wavelets to identify duplicate images, "Fast Multi-resolution Image Query" by Charles E. Jacobs, Adam Finkelstein, and David H. Salesin, Computer Graphics (Proceedings SIG-GRAPH 1995). Rowley et al. discloses converting the image to YIQ space. Labels may be concatenated.

U.S. Pat. No. 7,565,139 (Neven Sr. et al.) "discloses the remote server having an optical character recognition engine, an object recognition engine, a face recognition engine and an integrator module for generating a recognition output. In addition they disclose a rigid texture object recognition engine and an articulate object engine.

U.S. Pat. No. 7,437,351 (Page) discloses scanned in or electronically delivered published items, stored in a searchable data base. Ranked characterizations are returned for relevant web pages and published items. Hyperlinks to a more complete electronic representation of the published item may be returned. Publishers provide authorization to display copyrighted materials through a permission protocol. Figures show advertisements within text on pages.

U.S. Publication No. 2008/0107338 (Furmaniak et al.) discloses a media material analyzer that identifies block segments associated with columnar body text. Block segments belonging to a continuing article extending across multiple pages are identified. The identification is based on language statistics information and continuation transition information. Furmaniak et al. discloses analyzing pixel value change complexity along horizontal and vertical directions, language statistics information, layout transition information or both statistics and transition. In addition they disclose a layout transition analyzer. U.S. Publication No. 2008/0107337 (Furmaniak et al.) discloses a system for searching media material having a layout over a network.

U.S. Pat. No. 7,174,031 (Rhoads et al.) discloses a camera phone with a 2D imager decoding a watermark, and decoding steganographic data on imaged objects. Rhoads et al. discloses moving the phone to generate gestural input. Also disclosed are sensing and responding to digital watermarks, bar codes, RFID and sensing 2D or 3D objects. Information may be visual or hidden. Sound feedback may be provided when information is "found." Other applications include generating an automatic grocery store list and notification from a refrigerator, data processing on a computer system, composing a document, printing the document including machine readable indicia and storing data in association with data identifying a location of the electronic version of the document. In addition, the reference discloses presenting a printed document to an optical capture deice, processing image data, launching a software application based upon the data, and using the software to open an electronic version of the document. The data may be used for a reward program and may provide a secure method of authentification. Roads et al. also discloses a greeting card with data directing a computer to a web site with image, video, and audio that corresponds to the card. A magazine with data is disclosed, an advertisement page, data identifying an entry in a database, and a database containing an internet address of a web page associated with the advertisement. The reference discloses a print advertisement with data, processing the print advertisement to extract data which directs the user via an internet web browser to a web site that provides consumer information related to a product or service promoted by the print advertisement. Linking traffic from the use of the invention to access the website may be monitored. Data may be acquired from an object, decoded, and a subset of the decoded data may be submitted to a remote computer which determines whether a prize should be awarded in response. U.S. Pat. No. 6,449,377 (Rhoads) discloses modifying line widths or spacings of line art to encode information then decoding the information and using it for security purposes.

The prior art may not identify which instance of an advertisement in a magazine page that the user has selected. For instance the same ad with the same image and content may run in multiple magazines over an extended length of time. Measuring the "click" rate of such an ad would be difficult to associate to a particular magazine. Sending the image, instead of decoding the image using the camera, requires additional bandwidth and time.

The prior art looks at all images from everywhere. It would be simpler and more accurate to have an application that is publication specific. A publication specific application does not need to recognize products or textures or faces if it may identify the correct page and publication. The publisher knows what is on each page. The publisher knows what is going to be on each page.

A more difficult problem with the prior art is that it requires an existing picture of the printed page in order to update the database of a recognition engine. In many cases the artwork includes component parts of the page to be printed such as graphics, text, and pictures. A printed proof of the printed page may not actually use the halftone methods or screening that will be used to print the publication when it goes to press. In many cases the proof may only be a virtual proof and only available on an electronic display.

The prior art is disadvantaged as the recognition engine may not be updated until the page is printed and a picture is submitted for recognition. This does not allow time for a website to be created and the links developed prior to the publication going to press.

Using the prior art one may not confirm whether similar pages in the publication are all uniquely identified prior to printing the publication. The prior art returns multiple results back to the customer from which to choose. The returns may not be exclusive to the magazine publisher so the magazine publisher does not always get feedback for using the prior art.

The prior art of encoding a watermark within an image or advertisement requires an image. Further the watermark changes the advertisement or the image. In addition the watermark must be invisible or unobjectionable while being detectable by an inexpensive camera. Lastly watermarking text is difficult as there is no image content to embed the watermark in.

The prior art of adding a barcode or glyph detracts from the readability and visual appearance of the magazine or published page. A barcode or glyph uses valuable space on each page and changes the visual intent of the graphic artist.

SUMMARY OF THE INVENTION

Briefly, according to one aspect of the present invention a publisher creates the artwork for a page to be printed in a publication. The artwork is used to create a virtual proof of the printed page using a printing model. The virtual proof is a simulation of the page to be printed which includes details on how the printed page will be screened. Kodak MATCHPRINT Virtual Technology software may be used to generate the virtual proof. The virtual proof is used with a camera model to generate a set of features or a set of principle components that are used as a part of a uniform resource locator (URL). Publication information such as the magazine or newspaper name and publication data are appended as part of the URL. This process is repeated for each page in the publication. Pages with similar URLs are identified to determine if the artwork may be modified to create a more unique set of URLs. Once a final set of unique URLs is identified, a website is populated with all of the URLs.

Additional camera models may be used to generate additional URLs for each page. These additional URLs may be checked to determine that they too are unique. Pages with similar URLs are identified to determine if the artwork may be modified to create a more unique set of URLs. Multiple URLs may link to identical pages as there may be more than one URL per page depending upon the results of the multiple camera models. The publication is printed.

A user with a mobile camera and a camera application takes a picture of a printed page. The camera application may be publication specific so that it knows the name of the publication. The current date may be used to identify the current issue of the publication. Given the current date, and the publication day of the week or day of the month, the camera application will select the last publication date as the current issue date. The user may choose to override the current issue date and enter an earlier publication date. The mobile camera device is used to generate a URL from the picture of the page taken with the camera. The publication and publication date are appended to the generated URL. A browser application on the mobile camera device is used to display the web page associated with the generated URL.

The user may interact with the webpage on the mobile camera device and may indicate that he likes the article or object of the article or advertisement that is on the printed page. The user may blog or provides feedback about the printed page. The user may tweet about the page or subject of the page. The user may forward the page to email, Facebook, Google+, or other social media sites. The user may elect to read additional information about the page, or article, or object, or advertisement, or person that is shown on the page. The website may record the user's preferences and actions while browsing the page. This information may be provided to the publisher. The publisher may modify future publications or web pages depending upon the user's preferences. The publisher may personalize individual copies of future magazines for an individual or group of users.

It is an advantage of the present invention that the URL is generated prior to printing each page of a publication. It is an advantage of the invention that URLs are generated for each page and tested to determine that they uniquely identify the pages to be printed.

It is an advantage of the present invention that URLs that are not unique may be used to modify page artwork prior to printing the publication. If the page artwork is not modified the publisher may modify the website such that the webpage for the URL in question queries the customer to determine which page they are referring too. It is an advantage of the invention that the publisher and website creators know of the conflict prior to printing the publication.

It is an advantage of the present invention that the dedicated publication application resides on the user's mobile camera device. It is an advantage that the publication application is publication specific, or publisher specific, which simplifies the task of correctly identifying the publication and page. This enables the mobile camera device to generate the URLs from the camera instead of requiring sending of the image to a remote recognition engine. It is an advantage of the present invention that common advertisements combined with the application's publication name alert the publisher to which magazine the customer is viewing. Recognition engines are unable to identify identical printed advertisements and associate the image with specific publications.

It is an advantage of the present invention that the picture of the printed page indicates that the customer is viewing a copy of the publication.

It is an advantage of the present invention that the publisher's artwork does not require modification by adding 2D barcodes, 3D barcodes, glyphs, or watermarks.

It is an advantage of the invention that the invention provides a feedback mechanism for publications, articles, advertisement, objects, and people. It is an advantage of the invention that the publisher may collect user information, survey information, and measure advertisement response. The publisher may use this information to provide user specific publications on future issues. Pages printed in future user specific publications are also among the set of artwork to be printed that is analyzed with the invention prior to printing the future publications.

It is an advantage of the invention that individual objects on the printed page are not required to be recognized. The publisher knows and controls the content of the printed page and the invention refers the customer back to the publisher's website.

User specific pages, pages printed in an individual copy of a publication and delivered to an individual user, may be used to identify the specific user using the invention. User group specific pages, pages printed in a group copy of a publication and delivered to a group of users, may be used to identify the specific group of users using the invention. User groups may be demographic or geological. User groups may be oriented in time at different locations. For instance a specific advertisement or article may be published in differing geological areas at different times on different publication dates.

Publication advertisements may be auctioned to be placed in individual or group publications based on individual user and group user information. The invention may be used to provide feedback on these auction advertisement pages.

In an alternative implementation of the invention a publisher creates the artwork for a page to be printed in a publication. The artwork is used to create a virtual proof of the printed page using software such as Kodak MATCHPRINT Virtual Technology. The virtual proof includes details on how the printed page will be screened. The virtual proof is used with a camera model to generate a set of principle components that are used as page locators. Publication information such as the magazine or newspaper name and publication data may be appended as part of the page locators. This process is repeated for each page in the publication. Pages with similar page locators are identified to determine if the artwork may be modified to create a more unique set of page locators. A website is populated with a set of pages for the publication. Each website page has its own URL. A table is created mapping the set of page locators to the website publication URLs.

Additional camera models may be used to generate additional page locators for each page. These additional page locators may be checked to determine that they too are unique. Pages with similar page locators are identified to determine if the artwork may be modified to create a more unique set of page locators. Multiple page locators may link to identical pages as there may be more than one page locator per page depending upon the results of the multiple camera models.

After the publication is printed, a user with a mobile camera and a camera application takes a picture of a printed page. The camera application may be publication specific so that it knows the name of the publication. The current date may be used to identify the current issue of the publication. The user may choose to override the current issue and enter an earlier publication date. The mobile camera device is used to generate a set of principle components that are used as a page locator from the picture of the page taken with the camera. The publication and publication date may be appended to the principle components and used as a part of the page locator. A browser application on the mobile camera device is used to post the page locator to a website which returns a web page associated with the page locator. The web page is displayed in a browser window on the mobile camera device.

The magazine publisher may place a Trademark, symbol, advertisement, or other indication within the publication to alert the reader that the mobile camera application is available for use on this publication. The website pages may contain a query to the customer to confirm that the correct magazine, article, page, or publication date, was selected.

The mobile camera application may keep a record of the user's activity on the mobile camera device, mobile camera phone, cloud, or other remote storage location. This record may be made available for the user for quick referral or reference. User notes may be recorded and stored for each article. User notes may be kept locally on the mobile camera device, mobile camera phone, cloud, or other remote storage location. User records may be accessed, read, written, or modified using devices other than the user's mobile camera device such as a tablet, notepad, laptop, desktop, mobile phone, or dedicated reader such as an Amazon Kindle or Barnes & Noble Nook. Other devices containing remote access such as a mobile phone line, a land line, a broad band Ethernet line, a WiFi or Bluetooth output, may also access the website and view the content using the stored information.

The mobile camera application may keep the record of the user's activity for each page or publication as a widget, thumbnail, or other visual reference on the mobile camera device's desktop.

It is an advantage of the invention that the website and links may be created prior to publication. It is an advantage of the invention that a recognition engine does not require updating prior to publishing or printing the publication. It is an advantage of the invention that the mobile camera application does not require updating for each publication. It is an advantage of the invention that the mobile camera application does not require a database of each page that is to be printed. Alternatively the mobile camera application may be updated as need to provide updated camera information and more robust URL or page locator algorithms.

The publisher may use the user's preferences to modify the advertisement displayed on the website. The website may return the closest URL for URLs or page locators received from the mobile camera device which are not an exact match. Since the website knows that the match is not exact, the website may return either the closest match or a set of closest matches. The correct URL or page locator may then be sent back to the mobile camera device and stored. Individual mobile camera device settings used to generate the principle components, unique URLs, or page locators, may be updated on the individual mobile camera device based upon inexact matches.

The user preferences may be used by other applications on the mobile camera device. The user preferences may be used by other applications on other devices such as a tablet, notepad, laptop, desktop, mobile phone, a dedicated reader such as an Amazon Kindle or Barnes & Noble Nook, a television, a set-top box, a game station, a DVD player, a Blueray player, a radio, a car, a GPS device, or other device. The publisher may require the user to register the mobile camera application.

The mobile camera application may not require the user to actually snap a picture. Video from the camera may be used to feed a principle component analysis computation block in real time. Generated URLs or page locators may be displayed in an overlaid or adjacent web browser window. Real time feedback from the website, using the URLs or page locators, may be used to modify the displayed image of the publication's page on the mobile camera device. For instance a hidden message may be revealed, or additional colored objects may be displayed, or a subject in a picture on the printed page may be modified in the displayed image on the mobile camera device.

The invention and its objects and advantages will become more apparent in the detailed description of the preferred embodiment presented below.

DETAILED DESCRIPTION OF THE INVENTION

The present invention will be directed in particular to elements forming part of, or in cooperation more directly with the apparatus in accordance with the present invention. It is to be understood that elements not specifically shown or described may take various forms well known to those skilled in the art.

Figure 1:
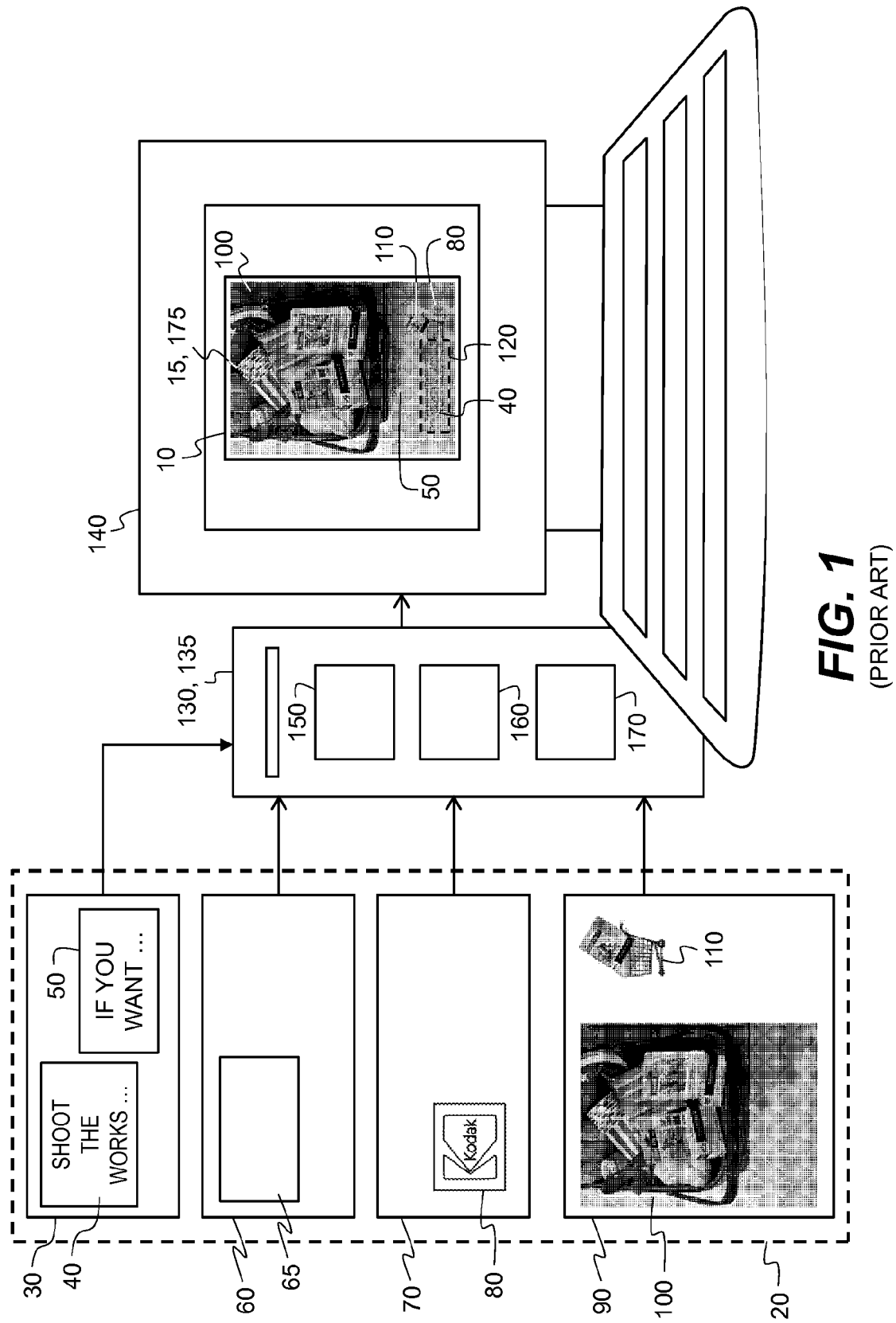
FIG. 1 is prior art workflow to generate artwork for a page to be printed.

Referring now to prior art shown in FIG. 1. Customer artwork 20 for a page to be published 10 is displayed 15 on display 140 of workstation 130. Customer artwork 20 includes text 30, page layout information 60, graphics 70, and pictures 90. A page layout software application 150 on the workstation 130 may be used to assemble the components, text 30, graphics 70, pictures 90, and generate the page layout information 60. Text 30 may include of one or more text objects such as 40 and 50. Graphics may include graphic objects such as a corporate logo 80. Graphics may also include line art, additional text such as titles, shades, fills, and other graphic items, not shown. Pictures may include images 100 and 110. Pictures may be black and white or colored. Text areas 120 may be defined on the page to be published 10. Defined text area locations, and graphic object locations, may be placed in a list 65 of page layout information 60. The location of each item on the page and the order of each item on the page may be placed in the list 65 of layout information. Items may have transparent or opaque areas such that overlaid items are visible or hidden.

Typically images 100 are grayscale images with 8 bits of resolution at a dot per inch resolution of 200 to 300 dpi. Images 100 may also be color images with 8 bits of resolution for each color plane, also at a resolution of 200 to 300 dpi. For instance images may be 300 dpi red, green, and blue color images with 8 bits per pixel for each of the red, green, and blue color channels. Other color schemes such as YIQ or LUV may be used to encode the image. Black and white images may be converted into a gray color image. Images may be binary images including a solid color or no color at 200 to 3600 dpi resolution.

The display 140 is typically a cathode ray tube or liquid crystal display and it displays RGB pixels at 72 to 110 dpi. This is a lower resolution than required to print the page for publishing.

Workstation 130 will also contain a hard disk 135 to store the customer artwork 20. Workstation 130 also contains a raster image processor 160 to render the customer artwork for printing. Rendering involves creating high resolution bitmap images at 1200 to 3600 dpi for each of the color planes for printing on a printing press. The color planes for printing are typically cyan, magenta, yellow, and black. Specialty colors may be used in addition or to replace one of the primary colors for printing. The bitmaps are stored on the hard disk 135. Workstation 130 also contains a virtual proof simulator 170 that accounts for ink to be used to print, the screening that is used to print, the paper or receiver that is used to print, and the customer artwork 20. The virtual proof simulator 170 and may be used to display a soft or virtual proof 175 on the display 140. The virtual proof 175 will be at the lower resolution of the display 140 but it will have the correct visual color of the print when printed on press plus it will have all of the artwork elements placed and overlaid in the correct position.

Figure 2:
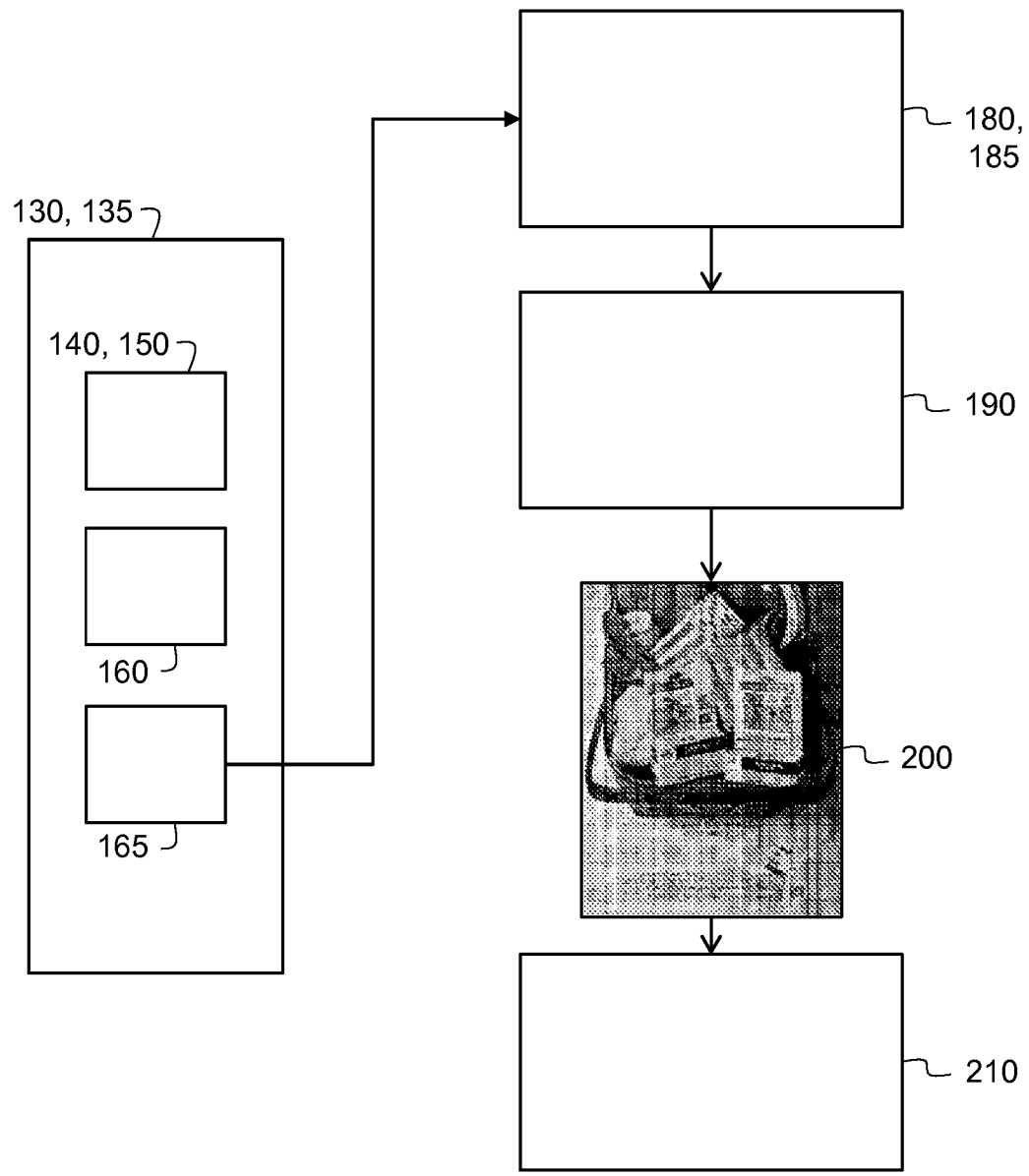
FIG. 2 is prior art flowchart of the printing process for publication.

FIG. 2 shows a prior art flowchart of the printing process for publication. High resolution bitmap images 165 on hard disk 135 are sent to a plate processor 180 to make plates 185 which are loaded into press 190. Press 190 then prints each printed page 200. Printed pages are assembled into printed publication 210. For a printed publication 210 some pages may be printed ahead of time and stored on site. Other pages may be printed at the last minute. Typically a weekly publication will submit a whole print job for press on Friday or Saturday night, printing all weekend, and delivering a new addition to newsstands by Monday morning.

The press 190 may be a lithographic offset press, a Gravure press, a flexographic press, a screen printing press, or a letter press. Alternately the press may be a digital press and printing plates may not be required. The plate writer may be a film writer where the film is used to expose an analog plate. The press 190 may be an inkjet press, electrophotographic press, a thermal printer, or any mechanism to print a printed page.

Figure 3:
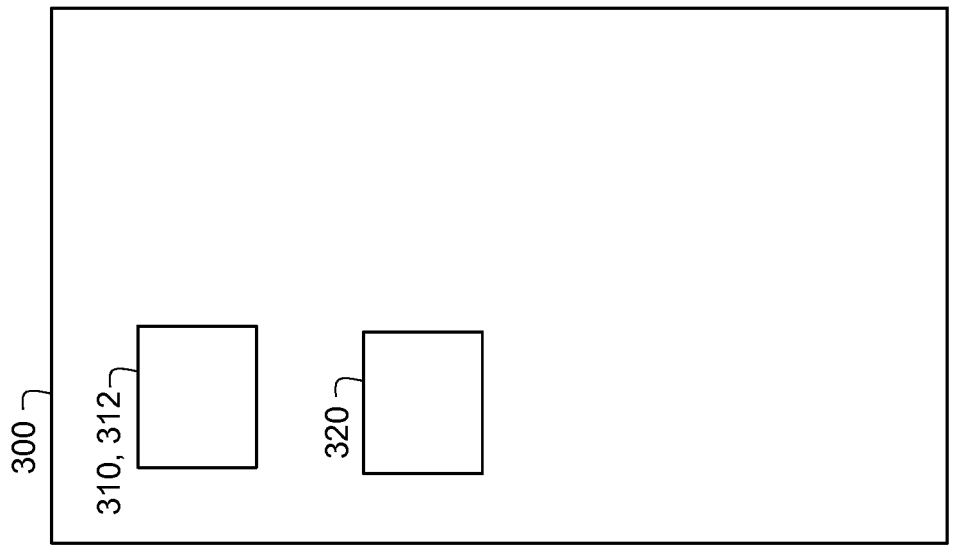
FIG. 3 is a flowchart including the present invention.
Figure 3:
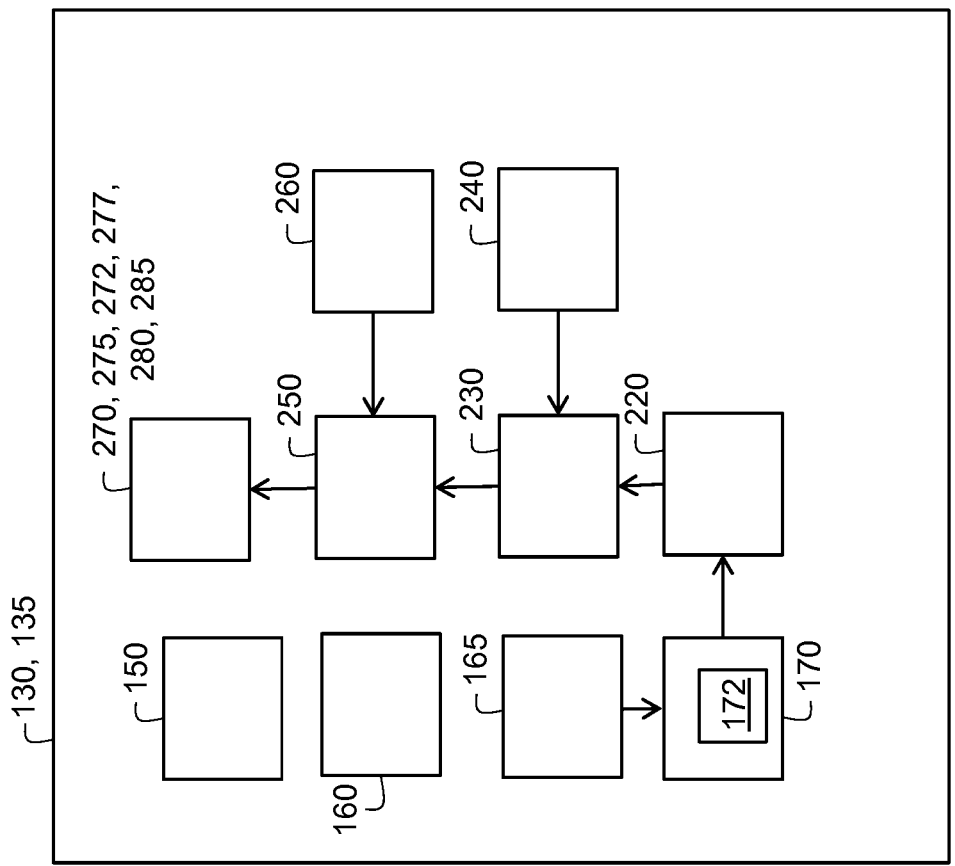

FIG. 3 is a flowchart including the present invention. Color bitmaps 165 of customer artwork 20, to be printed stored on hard disk 135 of workstation 130, are processed by the virtual proofing software 170 to generate a virtual proof file 220. The virtual proofing software 170 includes a printing model 172 which simulates printed pages. The virtual proof file 220 is a simulation of a printed page. Camera model 240 and virtual proof file 220 are used with a mobile camera simulation model 230 to produce a set of features 250 or set of principle components for the customer artwork 20. The set of features 250 may be combined with publication information 260 including publication name and date to create a URL 270. Alternately the set of features 250 may be combined with or without publication information 260 and used as a page locator 275.

Website 300 contains web page 310 with URL 270. Alternately website 300 contains a table 320 which converts URL 270 to a specific web page 310. Alternately website 300 contains web page 310 with a table 320 that converts post information including page locator 275 to URL to specific web page 310.

Multiple camera models 240, may be run using the virtual proof file 220 and the mobile camera simulation model 230 to produce multiple sets of features 250 for customer artwork 20. Each set of features may include a set of principle components. Each set of features 250 for customer artwork 20 may be combined with publication information 260 to create a set of URLs 272. The set of URLs 272 may be loaded into table 320 on website 300 to point to webpage 310.

Alternately the set of features 250 for customer artwork 20 may be combined with or without publication information 260 and used as a set of page locators 277. Set of page locators 277 are loaded into table 320 on website 300 that converts post information including the set of page locators 277 into a set of URLs specific to webpage 310.

Continuing to process all of the pages for publication 210, the invention is used independently on the customer artwork for each page to produce a set of URLs 280 for each page. Website 300 is populated with a set of pages 312 using the set of URLs 280 for each page. Alternately website 300 is populated with table 320 containing the set of URLs 280 for each page and the corresponding set of web pages 312.

Alternately the invention is used to create a set of page locators 285 for each page to be printed in publication 210. Then the website is populated with a table 320 which takes posted data including a set of page locators 285 and converts them to the correct page URL for the set of web pages 312. One skilled in the art will recognize that multiple camera models may be run for each page to compute a set of URLs for each page, and a set of sets of URLs for all of the pages in printed publication 210.

The invention is used to check each URL in the set of URLs, or check each page locator in the set of page locators, for uniqueness. Then the pages are identified with similar URLs or page locators, modify the artwork for these pages, and rerun the virtual proofing software and camera models to update the set of URLs or set of page locators. Once a unique set for each page is developed the publication may be printed.

Figure 4:
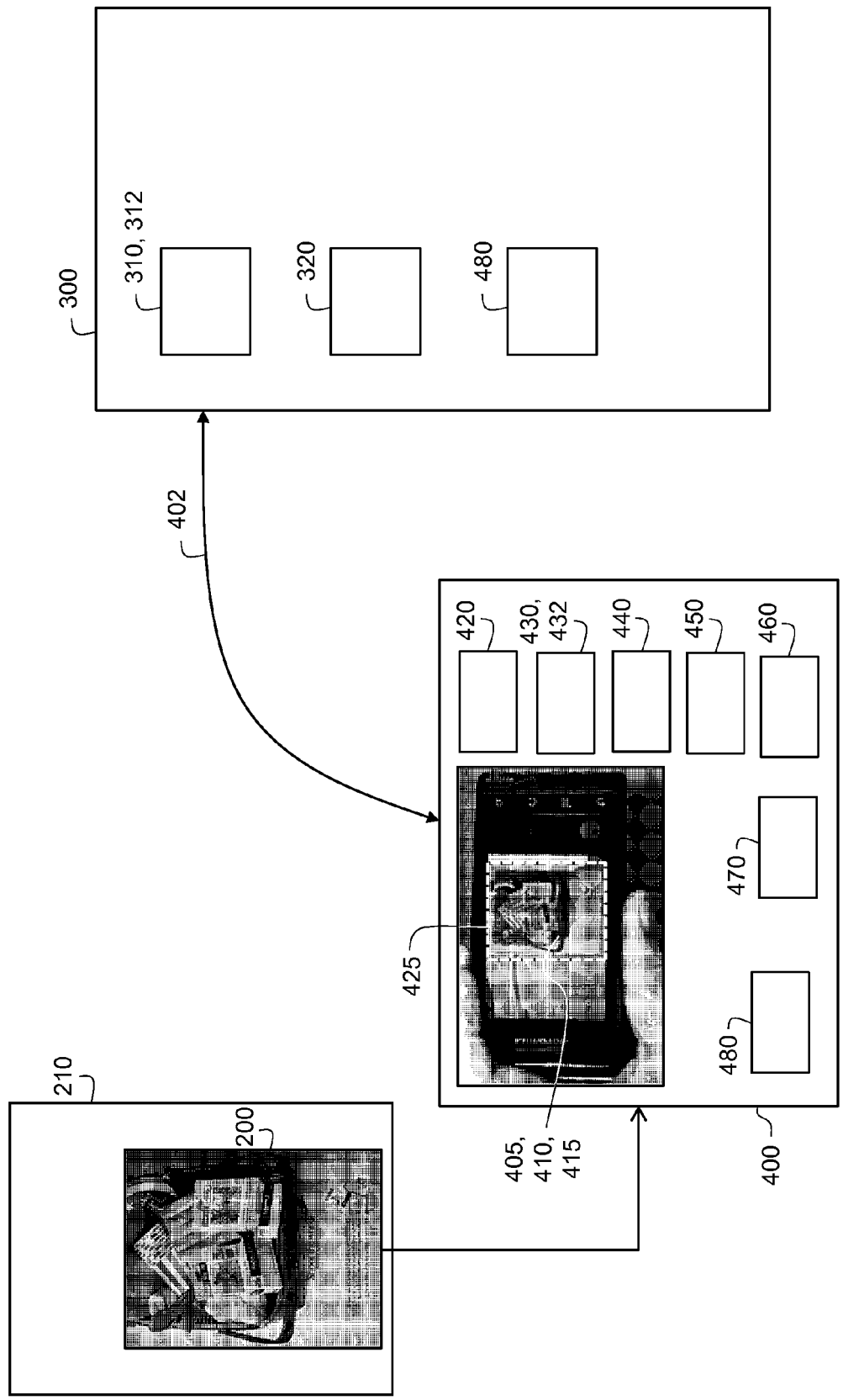
FIG. 4 is a flowchart detailing a portion of the present invention.

Referring to FIG. 4, the customer obtains a printed copy of publication 210 and is viewing page 200. Customers using mobile camera device 400 with a publication application 420 use the camera 405 within the mobile camera device to take a picture of the printed page 200. The mobile camera display 410 displays the image of the page 415. Publication application 420 computes the set of features 430 of image of page 415. The set of features may include a set of principle components. Set of features 430 are combined with publication name 440 and the latest publication date 450 to produce a unique URL 460. Unique URL 460 is used with web browser 470 on mobile camera device 400 to access website 300 using communication link 402. Customer actions while on website 300 for printed page 200 are stored in customer preference data 480. Alternately customer preference data may also be stored on website 300. Customer mobile camera device sends unique URL 460 to website 300 via browser 470 and communication link 402. Website returns webpage 310 which browser 470 displays on mobile camera device display 410. Website may also return user actions while visiting webpage 310 for inclusion in customer preference data 480.

Alternately publication application 420 computes the set of features 430 of image of page 415 for use as a page locator 432. Publication and application information may be combined with the calculated page locator 432. Page locator 432 is posted to website 300 using communication link 402. Website 300 looks up the page locator 432 post data in table 320 and returns webpage 310 via communication link 402 which is displayed in browser 470 on display 410 of mobile camera device 400.

The mobile camera device may be a mobile phone, smart phone, iPad, tablet, notepad, laptop, or desktop with a camera and a communication link. The communication link 402 may be indirect through a Wi-Fi, Bluetooth, broadband, or phone connection. The mobile camera device is any camera with a connection to a communication link 402. The publication application 420 may display a bounding box 425 to help the user align the magazine page to the camera.

Figure 5:
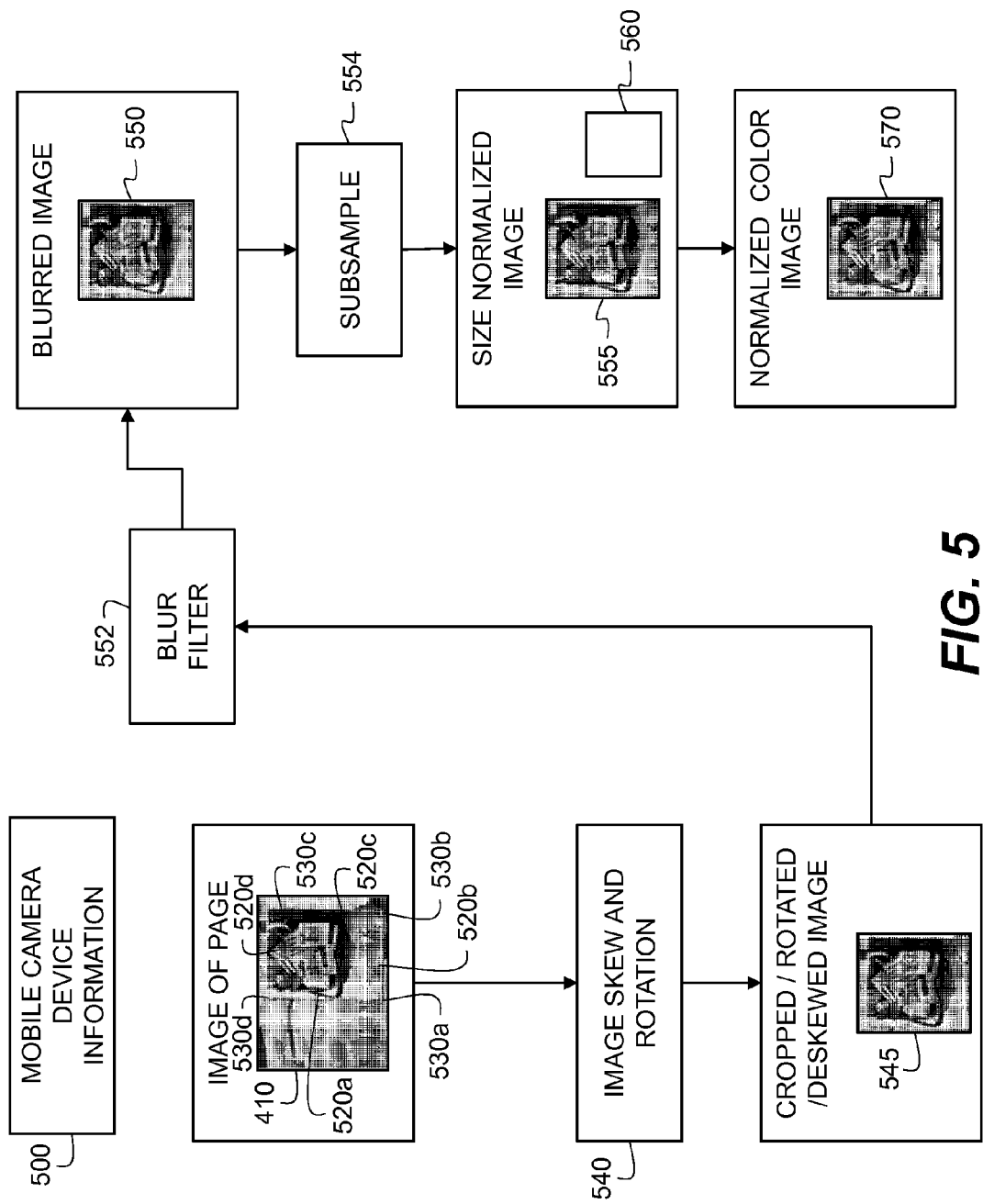
FIG. 5 is a flowchart of the process steps for computing a normalized color image of the present invention.
Figure 6:
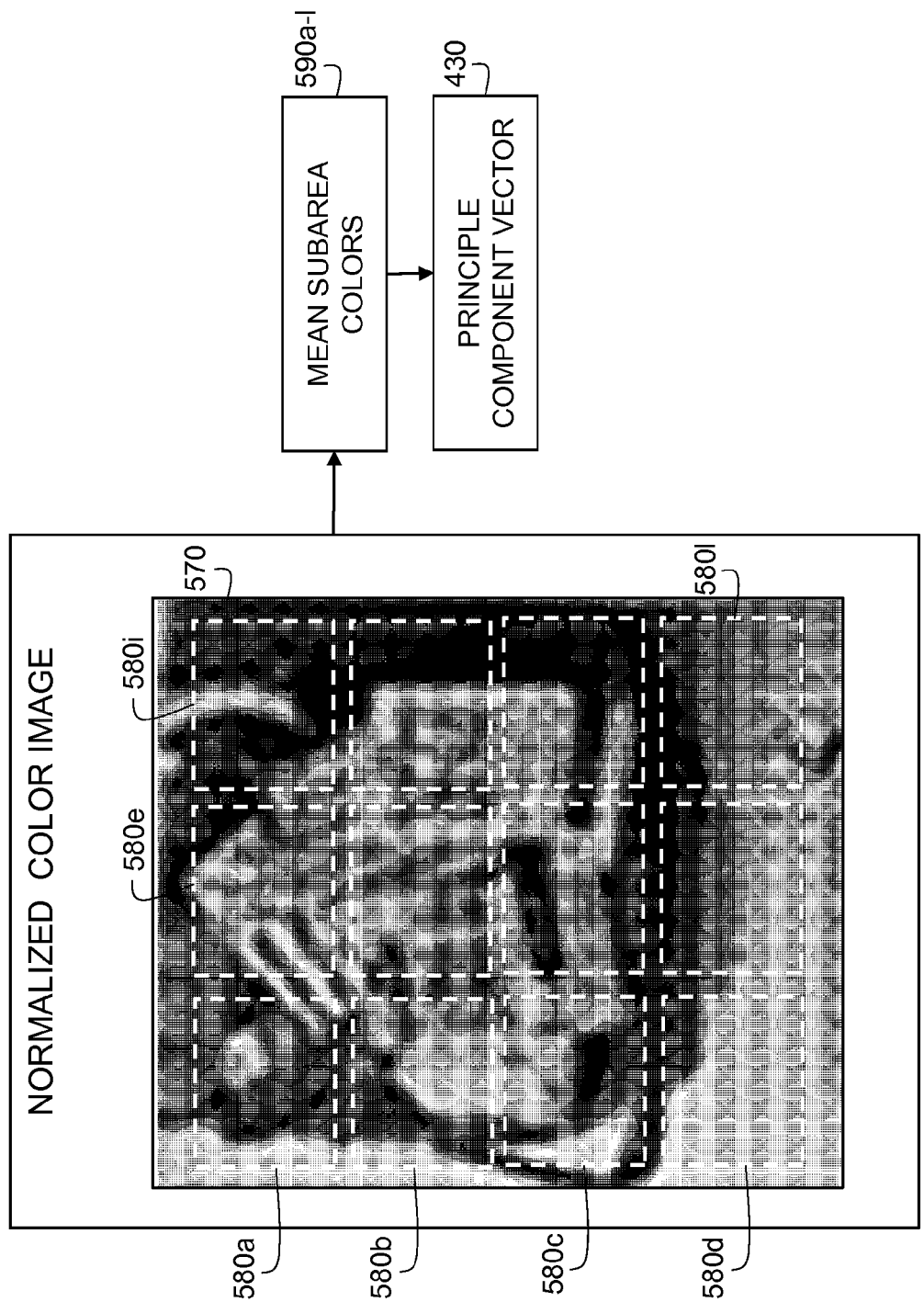
FIG. 6 is a flowchart computing a principle component vector from the normalized color image of the present invention.

Referring now to FIGS. 5 and 6 the process steps for computing the set of features are identified. The publication application has a data file with mobile camera device information 500 such as the size of the mobile camera. Typical mobile cameras are at VGA resolution 640 pixels by 480 lines or higher. A Motorola Droid phone camera is a 5K pixel camera with a resolution of 2592 pixels by 1936 lines. An Apple iPhone has an image size of 1600 pixels by 1200 lines.

The first step is to take an image of the page 410. Then the image is processed to account for changes in the aspect ratio and orientation. First the edges of the page 520a-d are identified. Then the corner positions 530a-d are computed. From the corner positions the image skew and rotation 540 is estimated. Adjustments for skew and rotation are created a cropped rotated deskewed image 545.

Next the rotated deskewed image 545 is blurred to create a blurred color image 550. The blur filter 552 may be a 2D Gaussian filter or a 2D average filter. The blur filter may be performed in two passes by applying 1D filters. The blur filter may be mobile camera dependent and stored in the mobile camera device information 500.

The blurred color image 550 is then subsampled 554 to a standard size 556 nominally 500 pixels by 500 lines resulting in size normalized image 555. The standard size 556 may be included in mobile camera device information 500.

Note that the publication application knows the size of the printed page and may use this to adjust the aspect ratio of the standard size such that all mobile camera devices would use a standard size normalized image 555. For instance if the magazine page is nominally 7.875" wide by 10.5625" high we may choose to normalize the image to a 373 pixel wide by 500 line tall image.

Note that the publication page aspect ratio may be portrait or landscape. The mobile camera application may prompt the user to rotate the camera to maximize the size of the page in the captured picture.

Next the brightness and contrast is normalized in the captured image. For each color we find the minimum and maximum pixel values 560. Then each color is normalized by subtracting the minimum and dividing by the difference resulting in a normalized color image 570.

Continuing on FIG. 6 the normalized color image 570 is divided into subareas 580*a-e*, 580*i*, 580*l* and the mean subarea colors 590*a-l* for each subarea is used as a part of the set of features 430. Mean subarea colors may be adjusted based upon the mobile camera device information 500. Mobile camera device information may include flash information. Flash information may also be available when the image was taken. Mobile cameras with flash may have difficulty due to specular reflections requiring the image of the page to be captured with the flash off. If so the mobile camera device information 500 will specify that the flash is not to be used.

Subareas may be different shapes and sizes. Subareas may overlap. It may be advantageous to have subareas that correspond to common items for the publication. For instance subareas may be defined that typically cover title areas, footer areas, column text areas, half page advertisements, full page advertisements, quarter and eight page advertisements.

Figure 7:
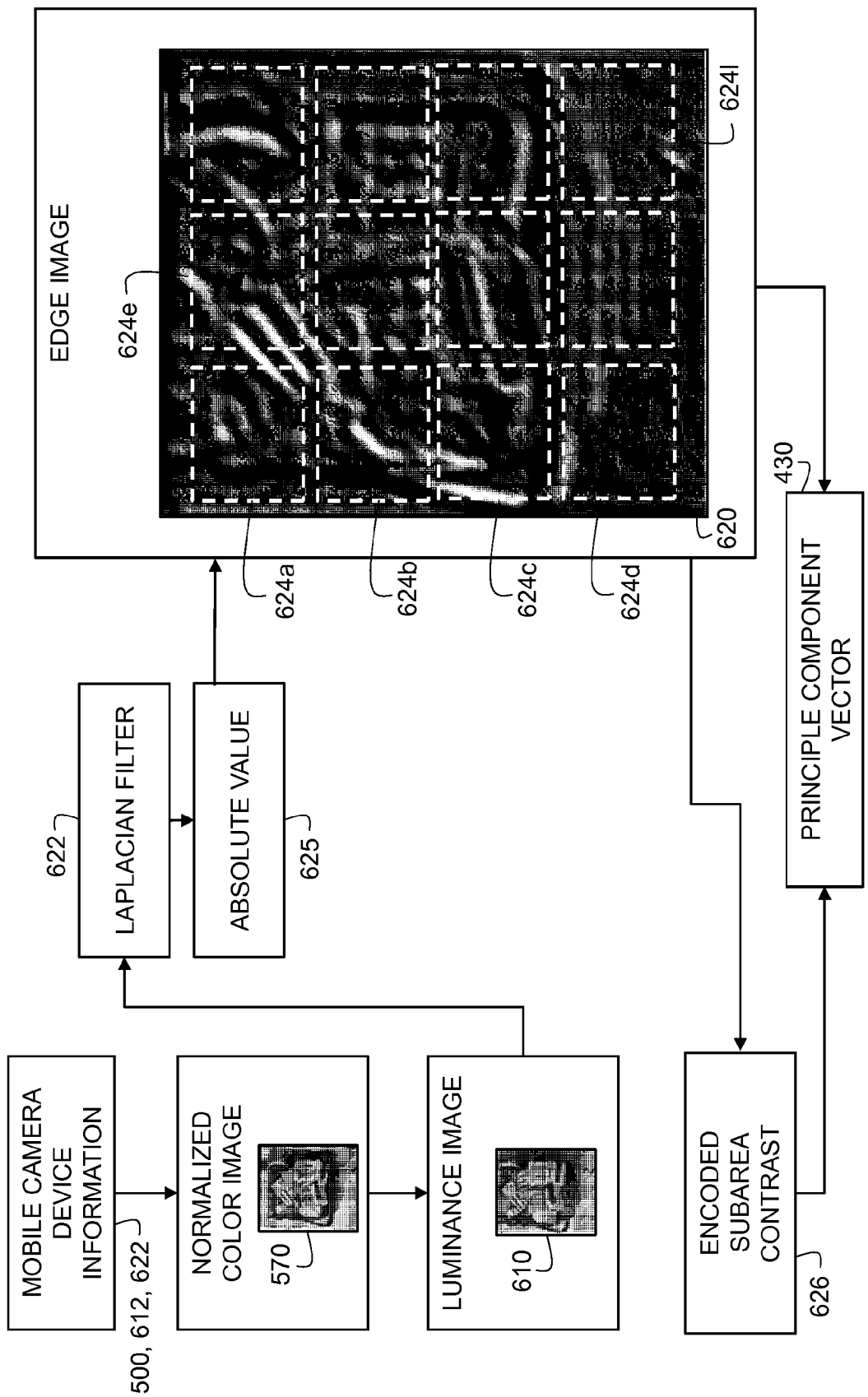
FIG. 7 is a flowchart showing computation of an edge image for use in computing additional components of the principle component vector of the present invention.

Next the camera information 500 is used to convert the normalized color image 570 into a luminance image 610 as shown in FIG. 7. Alternatively, a fixed conversion such as luminance equals 3×Red+4×Green+Blue may be used. Alternatively, a conversion such as L=Kred×Red+Kgreen×Green+Kblue×Blue where the constants 612 Kred, Kgreen, and Kblue are included in the camera information 500 may be used. The constants 612 may change depending upon whether the camera flash was used.

The luminance image 610 is then processed with a Laplacian filter 622 to generate an edge image. A suitable Laplacian filter 622 may be a convolution with a kernel of [−1 0 1] followed by a convolution with a kernel of [−1; 0; 1] where the first kernel is 1×3 and the second kernel is 3×1. Then the absolute value 625 of the output of the Laplacian filter 622 is taken to generate the edge image 620. Alternatively 128 code value may be added to normalize the mean edge value to a positive number and clip the results between 0 and 255. For each subarea 624*a-e*, 624*l* the maximum contrast 626 is recorded. The location a-e, l of subareas 624*a-e*, 624*l* with the highest contrast are recorded as a part of the principle component vector 430. Alternately subareas are scored as low, medium, medium high, and high contrast and a two bit encoded subarea contrast 626 for each subarea 624*a-l* is used as a principle component 430. The Laplacian filter 622 may be stored as mobile camera device information 500.

For example, 373 pixel by 500 line blurred image is normalized. Then 15 subareas of 120 pixels wide by 100 pixels tall are selected. 15 mean color densities are obtained using 8 bits of RGB for each mean density. The location of the top five highest contrasting subareas is recorded. Fifteen two-bit fields rating each subarea as low, medium, medium high, or high contrast is recorded. This gives a set of features 430 which is a vector of 15×3×8 bits, plus 5 addresses of four bits each plus five contrast levels assuming 16 bits each, plus fifteen two-bit fields ranking the contrast for a total vector length of 477 bits or 60 bytes.

One skilled in the art will recognize that there are many methods possible to obtain sets of features from an image. For instance edge image 620 with the normalized color image 570 may be used to create a density histogram using densities of the normalized color image 570 corresponding to low contrast pixels in edge image 620. Then one or more density bins representing page color at low contrast or large areas to our set of features may be added. Likewise a density histogram for high contrast pixels may be generated. Then a set of density bins representing color at high contrast to the set of features may be added. Similarly a density histogram for pixels with a mid-range of contrast to add mid-range contrast density to the set of principle components may be created. Density histograms at different contrast levels may be performed over the whole normalized color image 570, or over subareas 580*a-e*, 580*l* and 624*a-e*, 624*l*, or over a subset of subareas.

Figure 8:
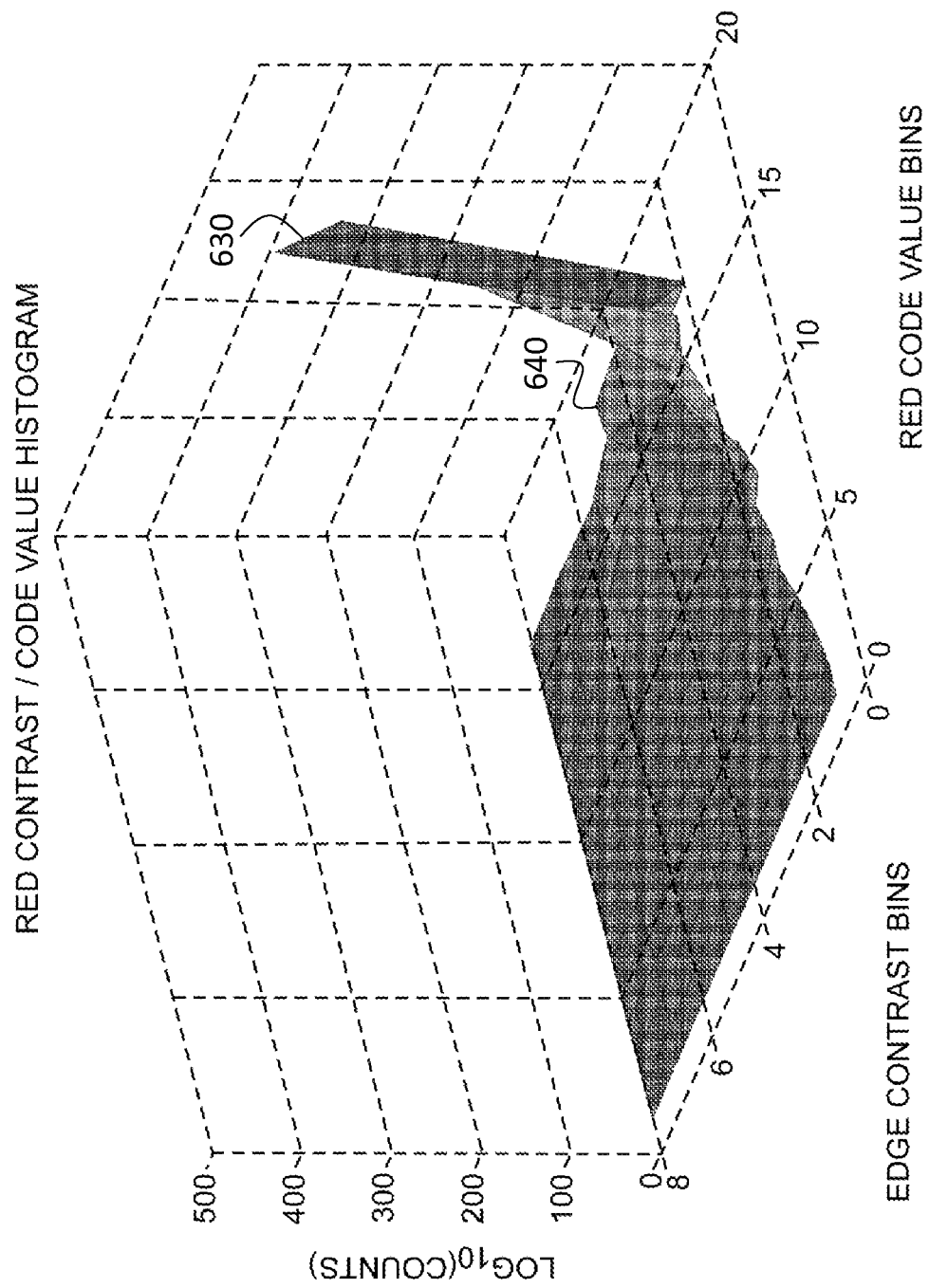
FIG. 8 is a red code value histogram as a function of red code value and edge contrast.

FIG. 8 shows an example red contrast red code value histogram for the normalized color image. There are 16 red code value bins covering a range of red code values from 0 to 255 with 16 levels in each bin. There are 8 edge code value bins covering a range of edge code values from 0 to 127 also with 16 levels in each bin. For each color, for each pixel, the edge value is looked up and calculate its edge bin location by dividing by 8 and rounding down. Then the color code value is looked up and calculate a color code value bin by dividing by 16 and rounding down. Then a 2D histogram array is incremented using the edge bin for the x axis and the color code value bin for the y axis. After processing all of the pixels the log base 10 of the 2D histogram is calculated and plotted as a 2D surface plot.

One example using the red contrast red code value histogram shown in FIG. 8 is to record the maximum low contrast density bin 630, and the maximum nonzero contrast density bin 640, in the set of features 430.

Figure 9:
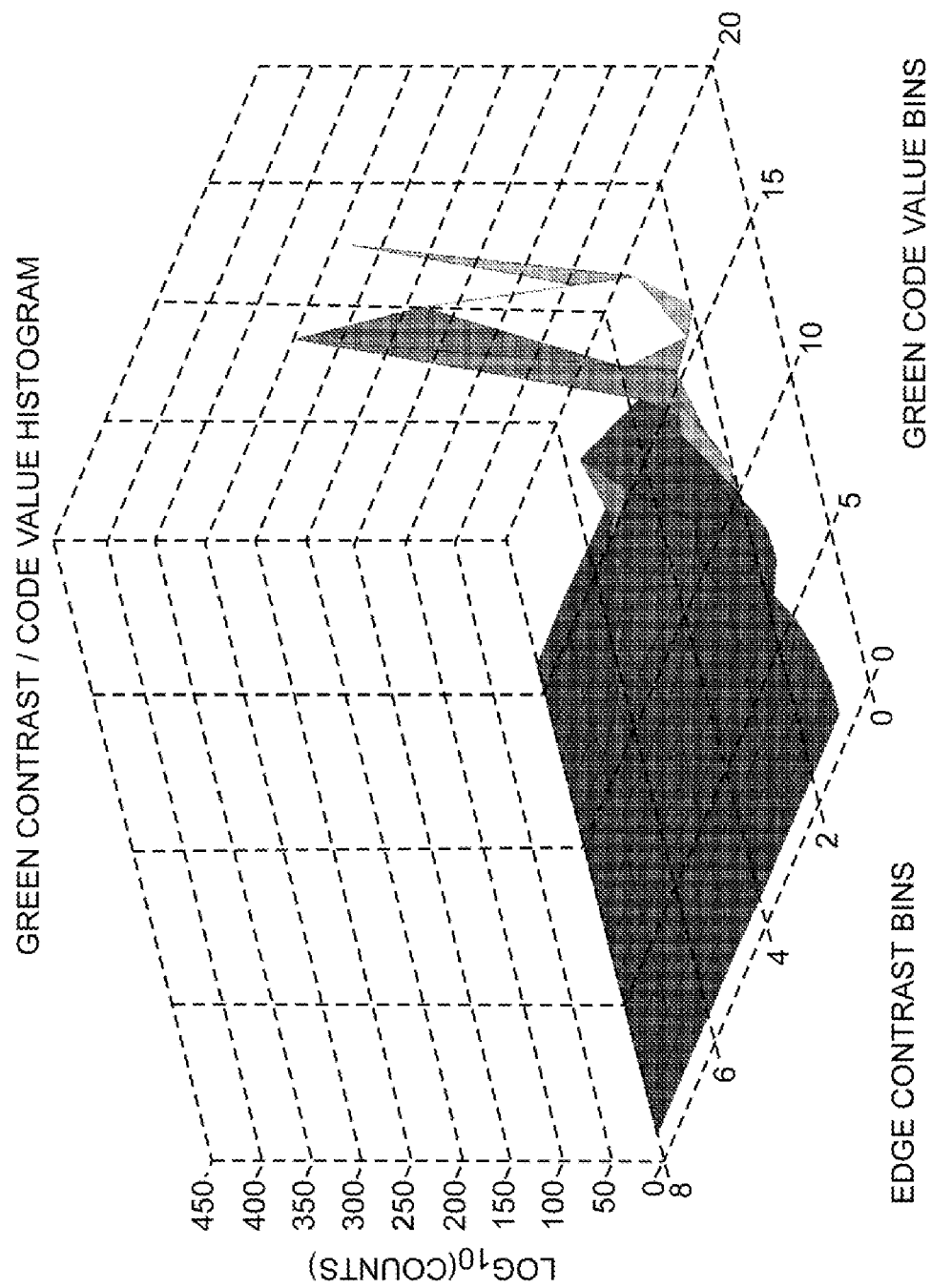
FIG. 9 is a green code value histogram as a function of green code value and edge contrast.
Figure 10:
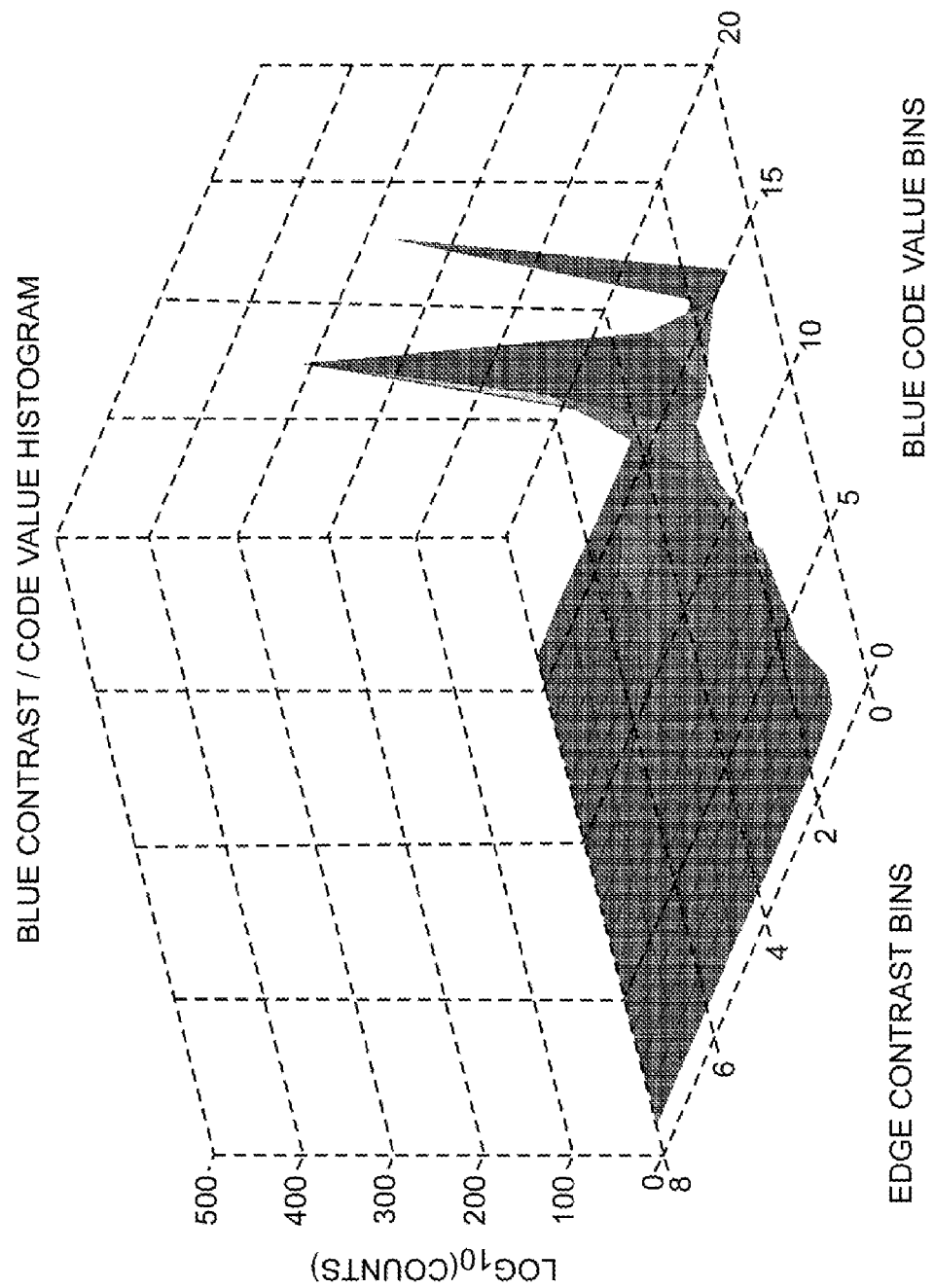
FIG. 10 is a blue code value histogram as a function of blue code value and edge contrast.

FIG. 9 is a green contrast green code value histogram for the normalized color image. FIG. 10 is a blue contrast blue code value histogram for the normalized color image. FIGS. 9 and 10 were calculated using the same process as for red on the green and blue color channels respectively. A subset of the contrast density histograms, or the complete histograms, or a subset of the colors may be used as a part of the set of features for this page. The contrast bin and density bin with the maximum contrast or highest contrasts may be recorded as a part of the set of features for this page.

One skilled in the art will recognize that a two-dimensional fast Fourier transform may be used to convert the normalized color image 570, subareas 580*a-e*, 580*l*, or luminance image 610, into a 2D spatial frequency image. The maximum spatial frequency or a set of binned spatial frequencies may be added to the set of features. This information may be useful in identifying specific magazine pages if the normalized color image 570 is at a high resolution as the printing process may typically screen images at 90 to 300 lines per inch. In addition each color, cyan, magenta, yellow, and black, is typically screened at a unique angle typically 15°, 75°, 7.5° and 45° respectively. Other angle sets may be used. Different angle sets and screen rulings may be used on different pages. As an example different angle sets may include screening magenta at the nominal cyan angle. Additional colorants may be used on press. For more than four colors, the complimentary color's angle is usually chosen as an area on the print will typically not have opposite colored ink printing in the identical area. Black ink may be substituted with a key color, for instance a predominantly brown image may substitute brown ink for black.

Figure 11:
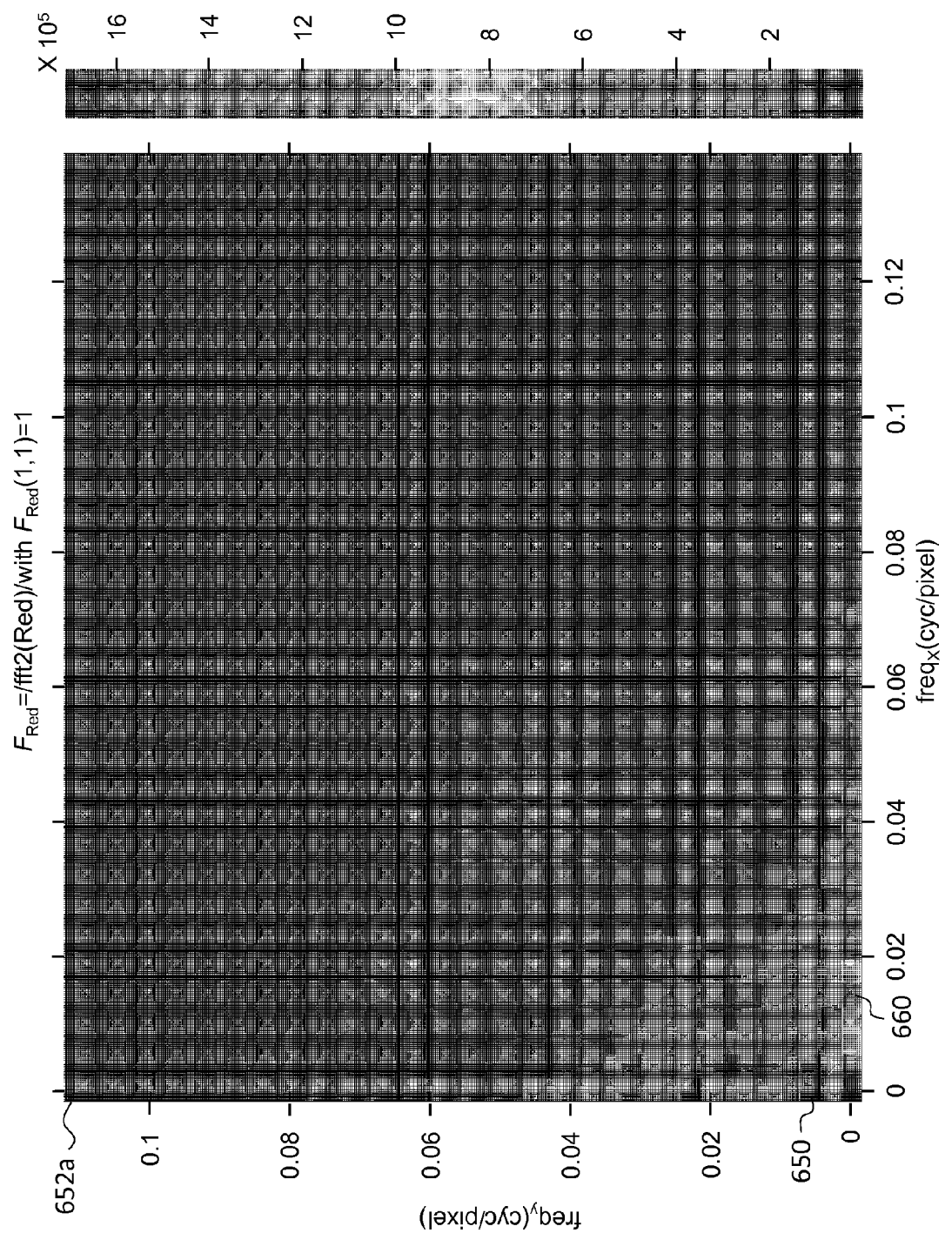
FIG. 11 is a 2D spatial frequency image.

FIG. 11 is a 2D spatial frequency image 652*a* in false color showing a plot of a 2D FFT for the red color plane of the normalized color image. To generate this plot a 2D FFT of the red color plane is performed. Then the absolute value is taken. The 2D FFT contains four quadrants, and interest is in the real, real, quadrant. The mean value of the normalized color image is represented by the 2D FFT value at f_x index 1, and f_y at index 1 location. This value is set to 1 so that it does not overwhelm the z-axis or color scale of the plot. In FIG. 11 the first 40 f_x and f_y records plotted as the higher frequencies did not contain much information. The f_x and f_y axis represent spatial frequencies in cycles/pixel. It is easily see from FIG. 11 that a peak frequency response 650 in response at f_x at index position 1 and f_y at index position 3. The second highest frequency response 660 is at f_x at index position 5 and f_y at index position 1 item 660. The location of the highest frequencies may be added to our set of features.

Figure 12:
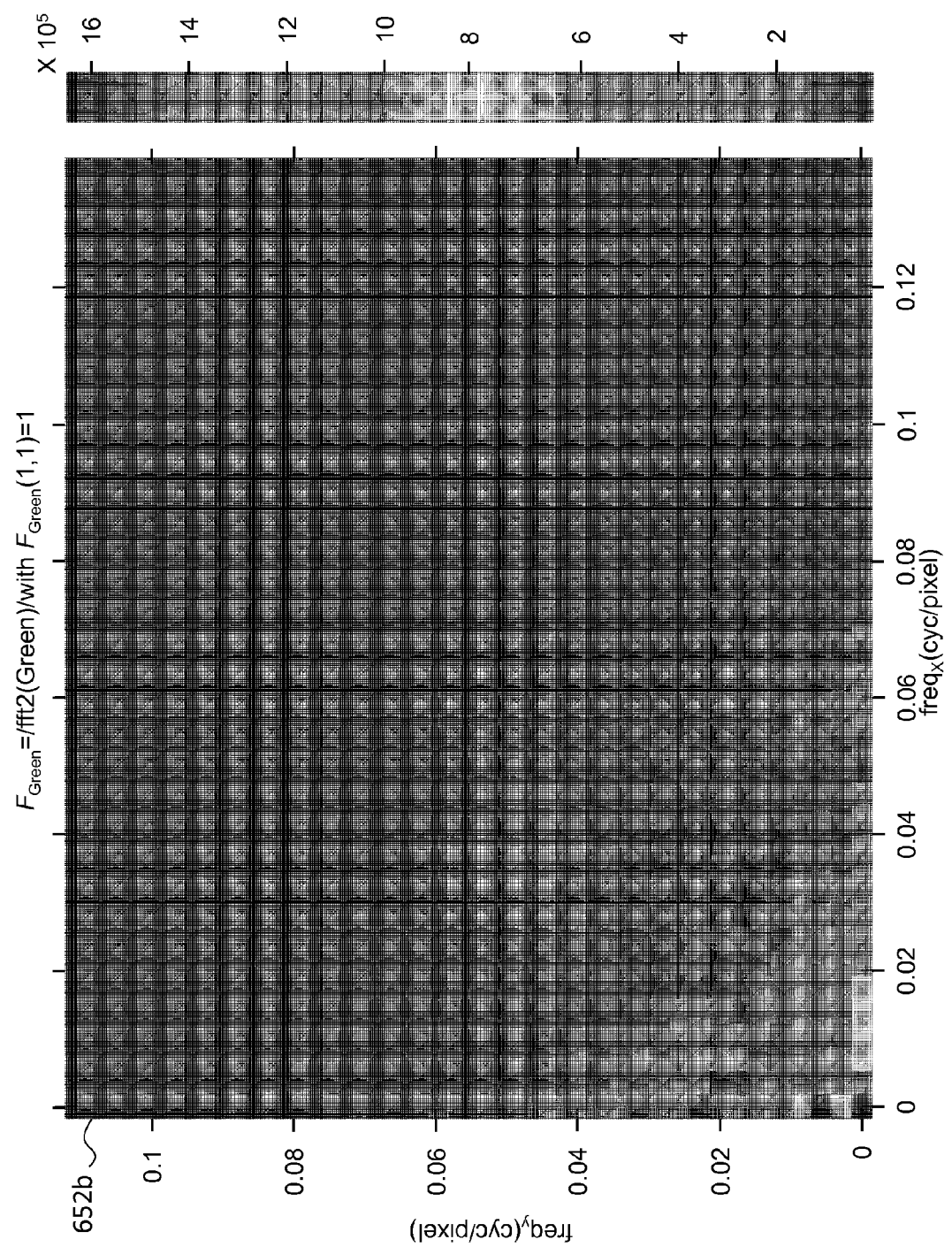
FIG. 12 is a 2D spatial frequency image.
Figure 13:
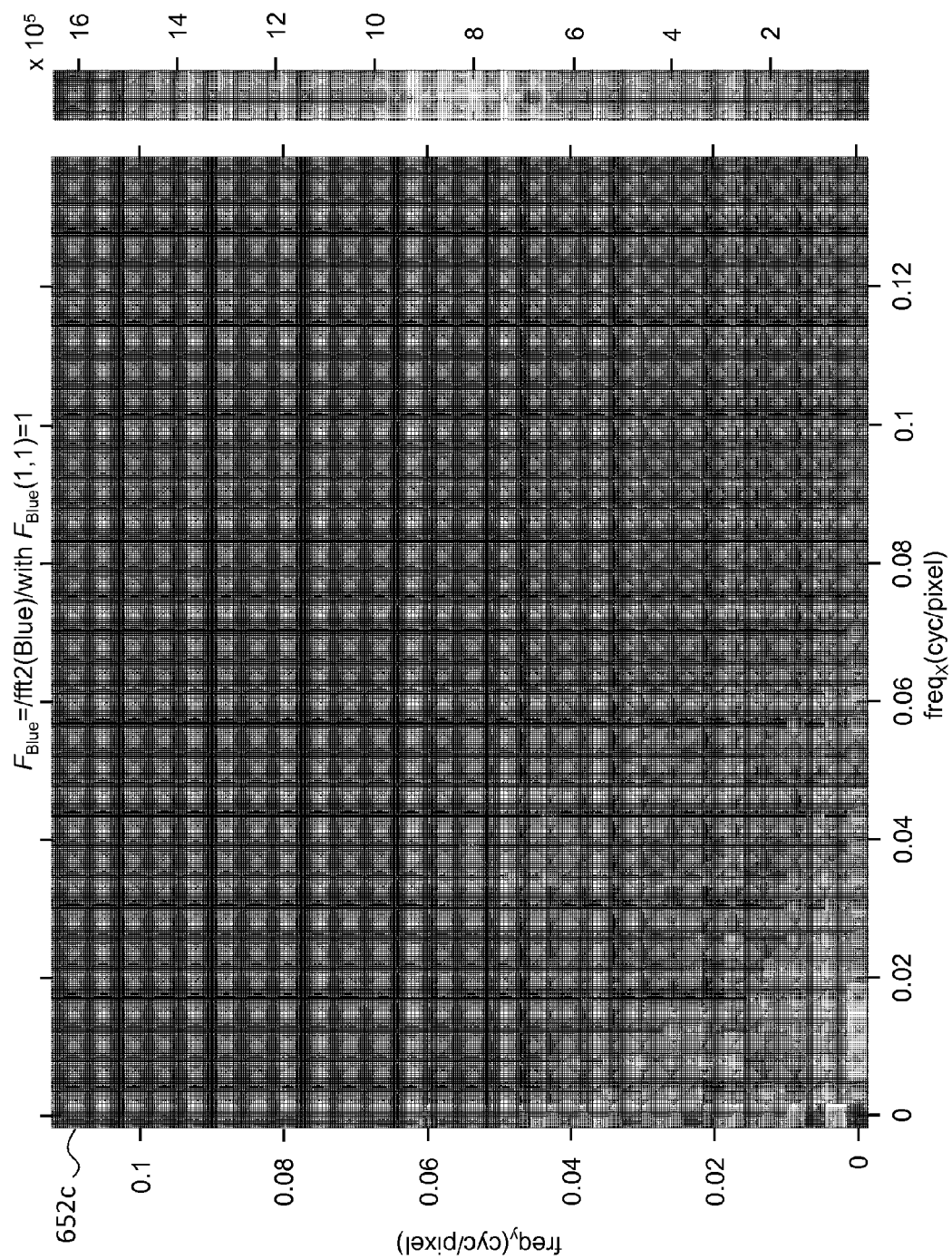
FIG. 13 is a 2D spatial frequency image.

FIG. 12 is a 2D spatial frequency image 652b in false color showing a plot of the 2D FFT for the green color plane of the normalized color image. FIG. 13 is a 2D spatial frequency image 652c in false color showing a plot of the 2D FFT for the blue color plane of the normalized color image. FIGS. 12 and 13 were computed using on the green and blue color channels with the same algorithm as for the red color plane and FIG. 11. The maximum 2D spatial frequencies of the green and blue color channels may also be recorded in the set of features.

When capturing an image of an 8½ by 11 inch page using a VGA camera of 640 pixels by 480 lines, in portrait orientation such that the 11 inch dimension is in the 640 pixel direction, we obtain a maximum resolution of 58.18 pixels per inch high by 56.47 pixels per inch wide. This low resolution makes it difficult to detect the screen frequencies, 90 to 300 lines per inch, and angles used to print images. The detection of screen frequencies is also harder when we blur the image to minimize sensitivity of identifying the corners. Using the 5M pixel camera on the Motorola Droid phone camera, 2592 pixels by 1936 lines, and capture in portrait orientation a maximum resolution of 235.6 pixels per inch high by 227.7 pixels per inch wide is obtained giving better resolution to detect screen frequencies and angles. Later cameras with 8M pixels or more will be able to do an even better job. To handle these different camera resolutions the normalized size is allowed to change based on the camera model which includes the sensor size. The camera model may also include a flag to indicate that the camera is capable of detecting screen rulings and angles. Alternately a calculation based on the publication size and the normalized image size may be used to set a flag indicating that the camera is capable of detecting screen rulings and angles.

One skilled in the art will recognize that wavelets or SIFT features in the principle components may also be included. The invention is advantaged in that orientation is not an issue recognizing a published page is known, the publication is known, and the printed page size is known. Therefore orientation information is not required to correctly identify the page.

One skilled in the art will recognize that the set of features may be encoded to reduce the size of the information. For instance all densities may be encoded using a common lookup table to reduce the density data from 8 bits per color to a sixteen bit integer. This integer may be further encoded by mapping common colors such as the minimum density or paper; the maximum density for cyan, magenta, yellow, or black; and the maximum densities of the overprinted colors red, green, and blue, to a four bit quantity.

Figure 14:
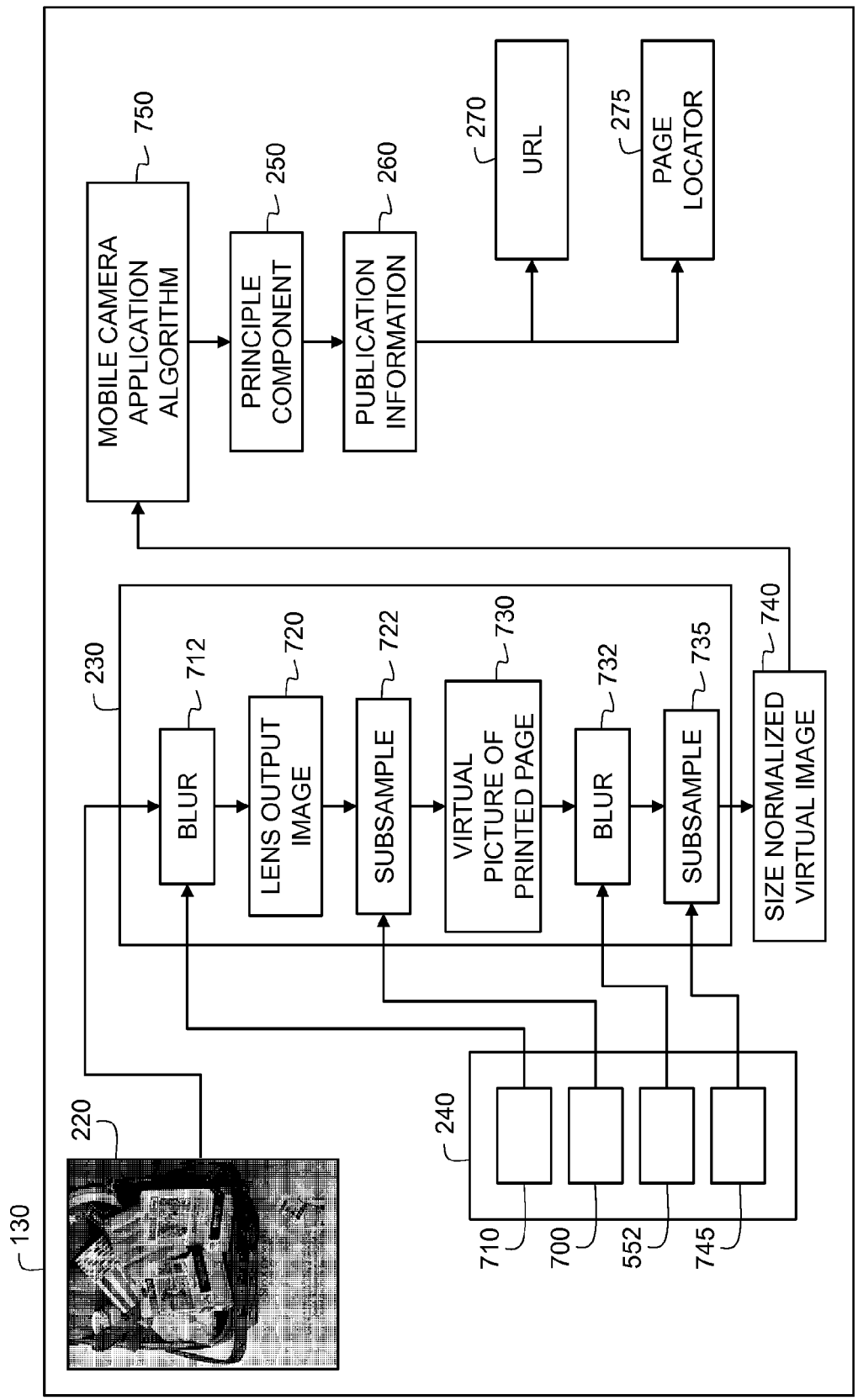
FIG. 14 is a flowchart showing conversion of a virtual proof file into a universal resource locator or page locator of the present invention.

FIG. 14 is a flowchart demonstrating conversion of the virtual proof file 220 into a set of features 250 for customer artwork 20 using the mobile camera simulation model 230. Given a camera model 240 which contains a sensor image size 700 and a camera lens blur function 710 the virtual proof file 220 is blurred 712 to obtain the lens output image 720 then subsample 722 the lens output image using the sensor image size 700 to obtain a virtual picture of the printed page 730. From the camera model 240 the blur filter 552 is obtained and further blur 732 the virtual picture of the printed page 730 prior to subsampling 735 to the size normalized virtual image 740. The size 745 of the size normalized virtual image may also be included in the camera model 240 or it may be a fixed size, or it may default to a fixed size if not overwritten by the parameters in the camera model. The size normalized virtual image 740 is then processed by the mobile camera application algorithm 750 running on the workstation 130 using the same algorithms as previously described to generate a set of features 250. Set of features 250 may be combined with publication information 260 including publication name and date to create a URL 270. Alternately set of features 250 may be combined with or without publication information 260 and used as a page locator 275. Multiple camera models 240 may be used to generate multiple URLs 270 or page locators 275 for each virtual proof file 220. A virtual proof file 220 is created for each page using the customer artwork 20 for each page of a publication to be published.

Ideally the invention enables the generation of artwork for all pages of a publication which generates unique URLs or page locators. In the case where multiple pages generate the same URL or page locator and the publisher is unwilling to further modify the artwork, the invention further alerts the publisher to the conflicting URLs or page locators and the website may be designed to query the customer as to which page is actually desired.

In the case where the invention is used to post page locator information to the website, for cases where the posted page locator is an inexact match to the page locators in the table the distance is calculated between the posted page locator and the entries in the table of page locators to select the closest page locator and return the page. This is done by breaking the page locator down into a vector using the set of features. For each page locator entry in the table the sum of the squared differences is calculated between the table entries set of features and the post data set of features. The entry with the lowest sum squared difference is the closest entry. The webpage is returned for the closest entry.

In the case where the invention is used to send a URL to the website, for cases were the URL is an inexact match URLs on the website, the distance between the sent URL and the URLs on the website may be calculated to select the closest page URL and return the page. This is done by breaking the sent URL down into a vector composed of its set of features. For each URL on the website the sum of the squared differences is calculated between the website URLs set of features and the sent URL set of features. The website URL with the lowest sum squared difference is the closest entry. The webpage is returned for the closest entry.

Figure 15:
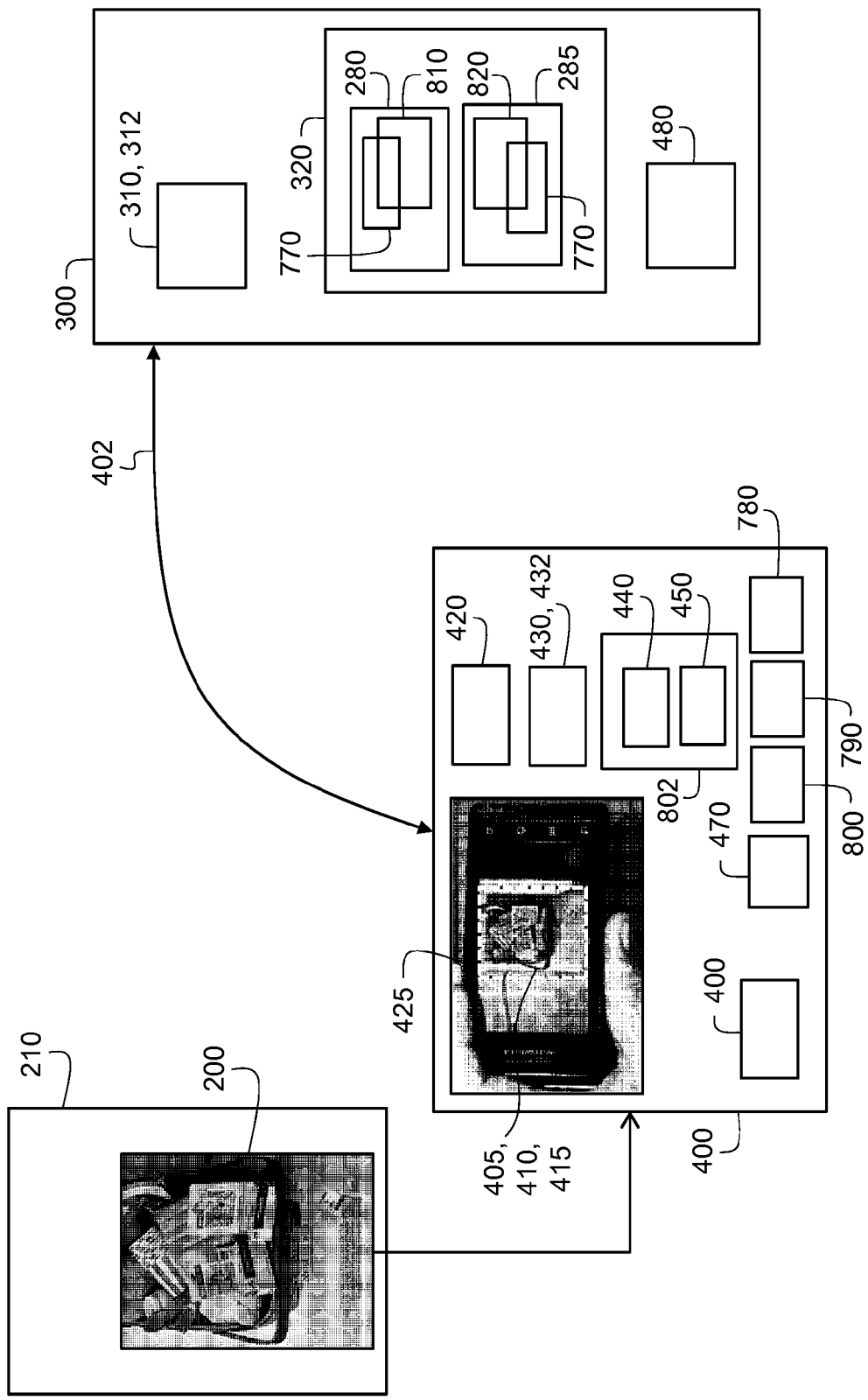
FIG. 15 is a flowchart showing the publication application communicating to the website.

FIG. 15 is a further embodiment of the present invention in which the publication application 420 communicates to the website 300 and downloads the latest table 320 of set of URLs 280 to the mobile camera device 400. The customer obtains a printed copy of publication 210 and is viewing printed page 200. Customer using mobile camera device 400 with a publication application 420 that uses the camera 405 within the mobile camera device to take a picture of the printed page 200. The mobile camera display 410 displays the image of the page 415. Publication application 420 computes the set of features 430 of image of page 415. For each URL in the set of URLs 280 the publication application 420 computes the set of features 770 of the URL and tests them against the computed set of features 430 to find the closest set of features 780. One test is to take the sum of the difference between each feature squared. Another test takes a weighted sum of the difference between each feature squared. The closest set of features 780 may be combined with publication information 802 including publication name 440 and date 450 to create a closest URL 790.

Closest URL 790 is used with web browser 470 on mobile camera device 400 to access website 300 using communication link 402. Customer mobile camera device sends closest URL 790 to website 300 via browser 470 and communication link 402. Website returns webpage 310 from the set of web pages 312 for this publication which browser 470 displays on mobile camera device display 410.

The table 320 containing the set of URLs 280 may have been created from multiple camera models 240. In this embodiment where the publication application tests for a closest URL then a subset of URLs 810 within the set of URLs 280 which were computed using a camera model 240 for this mobile camera device may be tested instead of testing all URLs or all page locators. The closest URL 790 would be chosen from the URLs specific to this mobile camera device type. The website may send a subset of table 320 specific to this mobile camera device 400.

In an alternative embodiment of the present invention reference is again made to FIG. 15 in which the publication application 420 communicates to the website 300 and downloads the latest table 320 of set of page locators 285 to the mobile camera device 400. The customer obtains a printed copy of publication 210 and is viewing printed page 200. Customer using mobile camera device 400 with a publication application 420 that uses the camera 405 within the mobile camera device to take a picture of the printed page 200. The mobile camera display 410 displays the image of the page 415. Publication application 420 computes the set of features 430 of image of page 415. For each page locator in the set of page locators 285 the publication application 420 computes the set of features 770 of the set of page locators 285 and tests them against the computed set of features 430 to find the closest set of features 780. One test is to take the sum of the difference between each feature squared. Another test takes a weighted sum of the difference between each feature squared. The closest set of features 780 may be combined with publication information 802 including publication name 440 and date 450 to create a closest page locator 800.

Closest page locator 800 is used with web browser 470 on mobile camera device 400 to access website 300 using communication link 402. Customer mobile camera device sends closest page locator 800 as post information to website 300 via browser 470 and communication link 402. Website 300 looks up the closest page locator 800 in table 320 and returns webpage 310 from the set of web pages 312 for this publication via communications link 402. Browser 470 displays page 310 on mobile camera device display 410.

The table 320 containing the set of page locators 285 may have been created from multiple camera models 240. In this embodiment where the publication application tests for a closest page locator then a subset of page locators 820 within the set of page locators 285 which were computed using a camera model 240 for this mobile camera device may be tested instead of testing all URLs or all page locators. The closest page locator 800 would be chosen from the page locators specific to this mobile camera device type. The website may send a subset of table 320 specific to this mobile camera device 400. One skilled in the art will recognize that the webpage displayed may contain content relevant to the printed page. Multiple links may be returned for pages with multiple advertisements, multiple articles, or multiple images. In addition each page may have publication or user preference specific information returned.

The invention has been described in detail with particular reference to certain preferred embodiments thereof, but it will be understood that variations and modifications can be effected within the scope of the invention. For example, publications may be magazines, newspapers, books, comic books, or any printed material. Publications may be viewed in electronic form on an electronic display such as CRT, LCD, Plasma, epaper, or eink. Electronic forms may be cell phones, tablets, notebooks, laptops, desktops, televisions, or outdoor signs. The mobile camera device may be a mobile phone with a camera.

The mobile camera device may contain a communication link such as mobile phone connection, a WiFi connection, or a Bluetooth connection. The communication link may be through a second device such as a camera tethered to a PC with a broadband or dialup account. The communication link may be through a second device such as a camera or laptop tethered via USB to a mobile phone. The application may be publisher specific and include more than one publication.

PARTS LIST

- 10 page to be published
- 15 displayed page to be published
- 20 customer artwork
- 30 text
- 40 text object
- 50 text object
- 60 page layout information
- 65 list
- 70 graphics
- 80 corporate logo
- 90 pictures
- 100 image
- 110 image
- 120 text area
- 130 workstation
- 135 hard disk
- 140 display
- 150 page layout application
- 160 raster image processor
- 165 bitmap images
- 170 virtual proof simulator
- 172 printing model
- 175 virtual proof
- 180 plate processor
- 185 plates
- 190 press
- 200 printed page
- 210 printed publication
- 220 virtual proof file
- 230 mobile camera simulation model
- 240 camera model
- 250 set of features
- 260 publication information
- 270 uniform resource locator (URL)
- 272 set of URLs
- 275 page locator
- 277 set of page locators
- 280 set of URLs
- 285 set of page locators
- 300 website
- 310 web page
- 312 set of web pages
- 320 table
- 400 mobile camera device
- 402 communication link 405 camera
410 display
415 image of page
420 publication application
425 bounding box
430 set of features
432 page locator
440 publication name
450 publication date
460 unique URL
470 web browser
480 customer preference data
500 mobile camera device information
520a-d edges of page
530a-d corner positions
540 image skew and rotation
545 deskewed image
550 blurred color image
552 blur filter
554 subsample
555 size normalized image
560 minimum and maximum pixel values
570 normalized color image
580a-e subareas
580i subareas
580l subareas
590a-l mean subarea colors
610 luminance image
612 constants
620 edge image
622 Laplacian filter
624a-e subarea
624l subarea
625 absolute value
626 maximum contrasts
630 maximum low contrast density bin
640 maximum nonzero contrast density bin
650 peak frequency response
652a-c 2D spatial frequency images
660 second highest frequency response
700 sensor image size
710 camera lens blur function
712 blur
720 lens output image
722 subsample
730 virtual print picture of the printed page
732 blur
735 subsampling
740 size normalized virtual image
745 size
750 mobile camera application algorithm
770 set of features
780 closest set of features
790 closest URL
800 closest page locator
802 publication information
810 subset of URLs
820 subset of page locators

The invention claimed is:

1. A method for enabling user interaction with a printed page comprising:
having artwork for a first page to be printed;
providing a printing model to simulate a first printed page using artwork;
simulating the first page to be printed using the printing model to create a virtual proof;
extracting a first set of non-symbolic image features from the virtual proof page;
appending the first set of non-symbolic image features to a pre-determined URL to form a second URL;
printing the first page;
providing a website at the second URL and receiving an access request for the website
photographing the printed page by a user using a mobile device having a camera and a computer, operating a software application;
appending the first set of non-symbolic image features from the photograph to the pre-determined URL to form the second URL; and
accessing the website with the second URL.

2. The method of claim 1 wherein artwork includes graphic elements, images, watermarks, human recognizable features, machine recognizable features, text or any combination.

3. The method of claim 1, further comprising:
embedding a publication specific tag in the pre-determined URL.

4. The method of claim 3, further comprising:
saving the second URL in a table.

5. The method of claim 1, further comprising:
providing artwork for a second page to be printed;
providing a printing model to simulate a second printed page using artwork;
simulating the second printed page using the printing model to create a virtual proof;
extracting a second set of non-symbolic image features from the virtual proof page;
appending the second set of non-symbolic image features to the pre-determined URL to form a third URL;
printing the second page; and
providing a new page at the website having the third URL and receiving an access request for the website.

6. The method of claim 5, further comprising:
comparing the second set of non-symbolic image features to the first set of non-symbolic image features to determine if they are the same; and
modifying the artwork for the first page to be printed or for the second page to be printed if the sets of non-symbolic image features are determined to be the same.

7. The method of claim 1, further comprising:
extracting non-symbolic image features from the digital image; and
generating the first URL associated with the digital image using the non-symbolic image features.

8. The method of claim 7, further comprising:
navigating to the second URL using an internet browser.

9. The method of claim 7, further comprising:
downloading a set of URLs associated with a publication which contains said printed page;
testing the generated second URL associated with the digital image against each URL in the set of URLs to find the closest URL in the set of URLs; and
navigating to the closest URL using an internet browser.

10. The method of claim 1, further comprising:
a camera model; and
applying the camera model to the virtual proof prior to extracting the first set of non-symbolic image features.

11. The method of claim 10 wherein:
a set of camera models are used to generate a set of first sets of non-symbolic image features; and
appending each first set of non-symbolic image features to the pre-determined URL to form a set of second URLs.

12. A method for enabling user interaction for a printed publication comprising:

having artwork for each page to be printed;
providing a printing model to simulate each printed page using artwork;
simulating each printed page using the printing model to create a virtual proof;
extracting a set of non-symbolic image features from each virtual proof;
appending the non-symbolic image features from each simulated page to a pre-determined URL to form a set of URLs;
printing the pages; and
providing a website with the set of URLs and receiving an access request for the website.

13. The method of claim 12, further comprising:
comparing each set of extracted features with every other set of extracted features to determine if each set of extracted features is unique; and
if any set of extracted features are not unique modify the art work for at least one of the corresponding pages.

14. A method of user interaction with a printed page and website, comprising:
photographing a printed page;
extracting a first set of non-symbolic image features from the photograph;
appending the first set of non-symbolic image features from the photograph to a pre-determined URL to form a new URL; and
accessing a website associated with the new URL.

15. A method for enabling user interaction with a printed page comprising:
having artwork for a first page to be printed;
providing a printing model to simulate a first printed page using artwork;
simulating the first page to be printed using the printing model to create a virtual proof;
extracting a first set of non-symbolic image features from the virtual proof page;
appending the first set of non-symbolic image features to a pre-determined URL to form a second URL;
printing the first page;
providing a website at the second URL and receiving an access request for the website; and
wherein the features include one or more of image density, image color, sub-area color, contrast, sub-area contrast, maximum spatial frequency information, screen angles and halftone screen frequency.

* * * * *